(12) United States Patent
Raghunathan

(10) Patent No.: US 12,366,834 B2
(45) Date of Patent: *Jul. 22, 2025

(54) DEVICE FOR CONTROLLING A SYSTEM WITH POLYNOMIAL DYNAMICS

(71) Applicant: Mitsubishi Electric Research Laboratories, Inc., Cambridge, MA (US)

(72) Inventor: Arvind Raghunathan, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 518 days.

This patent is subject to a terminal disclaimer.

(21) Appl. No.: 17/810,709

(22) Filed: Jul. 5, 2022

(65) Prior Publication Data

US 2024/0012366 A1   Jan. 11, 2024

(51) Int. Cl.
  *G05B 6/02* (2006.01)
(52) U.S. Cl.
  CPC ..................... *G05B 6/02* (2013.01)
(58) Field of Classification Search
  CPC ............... G05B 6/02; G05B 13/048
  See application file for complete search history.

(56) References Cited

U.S. PATENT DOCUMENTS

| 2011/0257799 A1* | 10/2011 | Al-Hamouz | G05B 13/0265 700/287 |
| 2012/0239167 A1* | 9/2012 | Carrette | G05B 19/41865 700/52 |
| 2014/0025210 A1* | 1/2014 | Joshi | G05D 7/0617 700/282 |
| 2019/0331571 A1* | 10/2019 | Marchese | G01N 3/066 |
| 2022/0403621 A1* | 12/2022 | Kinoshita | E02F 3/43 |

OTHER PUBLICATIONS

G. P. McCormick, "Computability of global solutions to factorable nonconvex programs: Part I—Convex underestimating problems," Math. Program., vol. 10, No. 1, pp. 147-175, 1976.

A. D. Rikun, "A Convex Envelope Formula for Multilinear Functions," J. Glob. Optim., vol. 10, No. 4, pp. 425-437, 1997, doi: 10.1023/A:1008217604285.

A. Del Pia, A. Khajavirad, and N. V. Sahinidis, "On the impact of running intersection inequalities for globally solving polynomial optimization problems," Math. Program. Comput., vol. 12, No. 2, pp. 165-191, 2020, doi: 10.1007/s12532-019-00169-z.

* cited by examiner

*Primary Examiner* — Ziaul Karim
(74) *Attorney, Agent, or Firm* — Gene Vinokur

(57) ABSTRACT

A device for controlling an operation of a system performing a task determines a current control input based on the feedback signal by solving a polynomial optimization of a polynomial function with a reformulation derived by introducing additional variables reducing the degree of the polynomial function till a target degree subject to constraints on a structure of the additional variables. The device solves a mixed-integer optimization problem to find a subset of encodings among all possible encodings of factorizations of the polynomial function that reduce the degree of the polynomial function to the target degree with a predetermined minimum number of additional variables and selects an optimal encoding from the subset of encodings with an optimal relaxation bound.

19 Claims, 20 Drawing Sheets

DEVICE FOR CONTROLLING A SYSTEM WITH POLYNOMIAL DYNAMICS

RELATED APPLICATIONS

This application is related to the U.S. patent application Ser. No. 17/366,718.

TECHNICAL FIELD

The present disclosure relates generally to system control, and more particularly to a device for controlling a system with polynomial dynamics.

BACKGROUND

A controller, such as model predictive control (MPC), is used in many applications to control complex dynamical systems. Examples of such systems include production lines, vehicles, engines, robots, power generators, and other numerically controlled machines.

The dynamics of these systems may be defined by polynomial functions. Accordingly, the dynamics of the systems may be referred to as polynomial dynamics. Control of the systems described with polynomial dynamics leads to stability analysis problems, optimal control problems, and control design problems, which can be referred to as polynomial optimization problems. For real-time applications of the control, these polynomial optimization problems need to be solved under strict timing constraints, often on embedded hardware with limited computational resources.

Currently, few optimization techniques try to solve these polynomial optimization problems under strict timing constraints by transforming the polynomial optimization problems into linear programs in a higher dimension space. However, in some cases, these available optimization techniques fail to solve the polynomial optimization problems within the strict timing constraints, even if they solve the polynomial optimization problems by transforming the polynomial optimization problems into linear programs.

Accordingly, there is a need for a device that solves the polynomial optimization problems efficiently to control the system described with the polynomial dynamics.

SUMMARY

It is an objective of some embodiments to provide a device to solve a polynomial optimization of a polynomial function under timing constraints by transforming the polynomial optimization problems into a higher dimension space. Some embodiments are based on a recognition that the causes of failure to satisfy the timing constraints are due to one or a combination of (i) the resulting size of the linear transformation and (ii) the weak relaxation bound obtained from the linear transformation. Indeed, the large size of the resulting transformation will result in increased computational times for solving the transformation. A weak relaxation resulting from the linear transformation will result in exploring many nodes in the iterative optimization such as branch & bound search tree. This again results in increased computational times.

It is an objective of some embodiments to provide a device to solve a polynomial optimization of a polynomial function with a reformulation derived by introducing a minimum number of additional variables reducing the degree of the polynomial function till a target degree subject to constraints on a structure of the additional variables.

In order to derive the reformulation, it is an objective of some embodiments to solve a mixed-integer optimization problem to find an optimal solution among all possible encodings of factorizations of the polynomial function such that the optimal solution reduces the degree of the polynomial function till the target degree with the best relaxation bound among the possible transformations to linear programs when constrained by the number of introduced additional variables. It is also an objective of some embodiments to control a system performing a task by solving polynomial optimization of the polynomial function with the reformulation that achieves the best relaxation bound when restricted to introducing a certain number of additional variables.

To control the system performing the task, it is an objective of some embodiments to submit a sequence of control inputs to the system. As a result, the system may change states associated with the system according to the task. To this end, some embodiments receive a feedback signal including a corresponding sequence of measurements. In an example embodiment, each measurement of the corresponding sequence of measurements is indicative of a state of the system caused by the corresponding control input. For instance, the system may be an electrical power grid and/or an electrical elevator. In these example cases, the sequence of control inputs may be submitted to the electrical power grid and/or the electrical elevator.

To submit the sequence of control inputs, it is an objective of some embodiments to determine, e.g., at each control step, a current control input for controlling the system based on the feedback signal including a current measurement of a current state of the system by solving a polynomial optimization of a polynomial function. As used herein, the polynomial optimization may be a minimization of the polynomial function. For instance, the polynomial function may be a multilinear program, a mixed-integer nonlinear program, or the like.

Some embodiments are based on the realization that the polynomial optimization of the polynomial function may be complex to solve and may be a time-consuming process. To this end, it is an objective of some embodiments to derive a reformulation for the polynomial optimization. In other words, it is an objective of some embodiments to reduce the degree of the polynomial function to a target degree. As used herein, the reformulation may be a degree-reduced version of the polynomial function. In order to derive the reformulation, some embodiments factorize the polynomial function by introducing additional variables. As used herein, the factorization may refer to reducing the degree of the polynomial function to the target degree by introducing the additional variables. Since the reformulation is derived by introducing the additional variables, the reformulation may be subjected to constraints on the structure of the additional variables. According to some embodiments, the polynomial function may be factorized to at least one of a bilinear programming reformulation, or a trilinear programming reformulation by setting the target degree.

Some embodiments are based on the realization that the judicious introduction of additional variables can significantly reduce the computational times. If the transformation results in the introduction of a large number of additional variables, then the resulting transformation will result in increased computational times for solving the transformation. The solution of the transformation is a step that is repeated many times as part of the solution of the polynomial optimization problem. The linear transformation is employed to compute a lower bound on the globally optimal solution of the polynomial optimization problem. However, if the linear transformation results in a lower bound that is very far from the globally optimal solution of the polynomial optimization, then the solution process will require increased computational time.

Some embodiments are based on the realization that there may be multiple ways to factorize the polynomial function by introducing the additional variables, leading to multiple possible factorizations. To this end, it is an objective of some embodiments to evaluate all possible factorizations of the polynomial functions and encode all possible factorizations in one set such that a factorization that leads to the largest relaxation bound among all possible factorization restricted by the number of additional variables introduced may be selected. As used herein, the size-constrained best bound factorization may correspond to the factorization that is determined as having the largest relaxation bound when constrained to introducing no more than a specified number of additional variables. In some embodiments, the additional variable may be a product of intermediate additional variables ending with a product of at least two of the original variables of the polynomial function. In some other embodiments, the additional variable may be a product of an intermediate additional variable and an original variable of the polynomial function. The additional variable is at least one of a bilinear product or a trilinear product.

In order to determine all possible factorizations, some embodiments define each possible factorization of a monomial in the polynomial function as an in-tree having properties: a root of the in-tree corresponds to an original monomial of the polynomial function, leaf nodes of the in-tree correspond to the original variables of the original monomial, every node other than the leaf nodes has two child nodes each of which represents a monomial; and a product of the monomials of the child nodes equals a monomial represented by a parent node of the child nodes.

Accordingly, each possible factorization of the monomial reads on a representation of the in-tree. In order to encode all possible factorizations, it is an objective of some embodiments to represent each monomial in the polynomial function as a decision diagram such that the decision diagram encodes all possible factorizations of the monomial through the collection of paths in the decision diagram. To this end, some embodiments produce a set of decision diagrams, where each decision diagram corresponds to the monomial in the polynomial function. According to some embodiments, each path may define different additional variables factorizing the monomial. According to some embodiments, the decision diagram encoding every possible linearization of the multilinear monomial is the in-tree having a root including original variables of the multilinear monomial.

In order to select the size-constrained best bound factorization, it is an objective of some embodiments to solve a mixed-integer optimization problem. According to some embodiments, the mixed-integer optimization problem may be formulated such that solving the mixed-integer problem finds an optimal solution among all possible encodings of the factorizations of the polynomial function that reduces the degree of the polynomial function to the target degree with the largest relaxation bound when the number of additional variables is restricted to be no more than a given number. That given number can be specified as a design parameter imposed as a constraint on the mixed-integer optimization.

According to some embodiments, the mixed-integer optimization problem solves a bilevel optimization problem where the outer-level specifies the set of arcs that are selected across the decision diagrams while restricting the set to be no more than the specified number and that the chosen arcs indeed define a reformulation of each monomial to a linear problem. The inner-level problem computes the relaxation bound by solving a linear program over the variables introduced as a result of a particular choice of arcs in the decisions diagrams. A key realization is a novel method for converting the bilevel mixed-integer optimization problem to a single-level mixed-integer optimization. This allows the identification of the size-constrained best bound factorization using various mixed-integer optimization algorithms. Since the reformulation is derived by identifying the one with the best relaxation bound when restricted to introducing certain number of additional variables, computation to solve the polynomial optimization with the reformulation is reduced in comparison to other available optimization techniques. Accordingly, the polynomial optimization of the polynomial function is solved in an efficient manner.

Accordingly, one embodiment discloses a device for controlling an operation of a system performing a task. The device includes a transceiver that submits a sequence of control inputs to the system thereby changing states of the system according to the task and receives a feedback signal including a corresponding sequence of measurements, each measurement is indicative of a state of the system caused by the corresponding control input. The device further includes a feedback controller that determines a current control input for controlling the system based on the feedback signal including a current measurement of a current state of the system by solving a polynomial optimization of a polynomial function with a reformulation derived by introducing additional variables reducing a degree of the polynomial function till a target degree subject to constraints on a structure of the additional variables. Furthermore, the device includes an optimal factorable reduction module that solves a mixed-integer optimization problem to find an optimal solution among all possible encodings of factorizations of the polynomial function that reduces the degree of the polynomial function till the target degree resulting in a size-constrained best-bound factorization.

Accordingly, another embodiment discloses a method for controlling an operation of a system performing a task. The method comprises submitting a sequence of control inputs to the system thereby changing states of the system according to the task; receiving a feedback signal including a corresponding sequence of measurements, each measurement is indicative of a state of the system caused by the corresponding control input; determining a current control input for controlling the system based on the feedback signal including a current measurement of a current state of the system by solving a polynomial optimization of a polynomial function with a reformulation derived by introducing additional variables reducing a degree of the polynomial function till a target degree subject to constraints on a structure of the additional variables; and solving a mixed-integer optimization problem to find an optimal solution among all possible encodings of factorizations of the polynomial function that reduces the degree of the polynomial function till the target degree resulting in a size-constrained best bound factorization.

Accordingly, yet another embodiment discloses a non-transitory computer-readable storage medium embodied thereon a program executable by a processor for performing a method for controlling an operation of a system performing a task. The method comprising submitting a sequence of control inputs to the system thereby changing states of the system according to the task; receiving a feedback signal including a corresponding sequence of measurements, each measurement is indicative of a state of the system caused by the corresponding control input; determining a current control input for controlling the system based on the feedback signal including a current measurement of a current state of the system by solving a polynomial optimization of a polynomial function with a reformulation derived by introducing additional variables reducing a degree of the polynomial function till a target degree subject to constraints on a structure of the additional variables; and solving a mixed-integer optimization problem to find an optimal solution among all possible encodings of factorizations of the polynomial function that reduces the degree of the polynomial function till the target degree resulting in a size-constrained best bound factorization.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open-ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1:
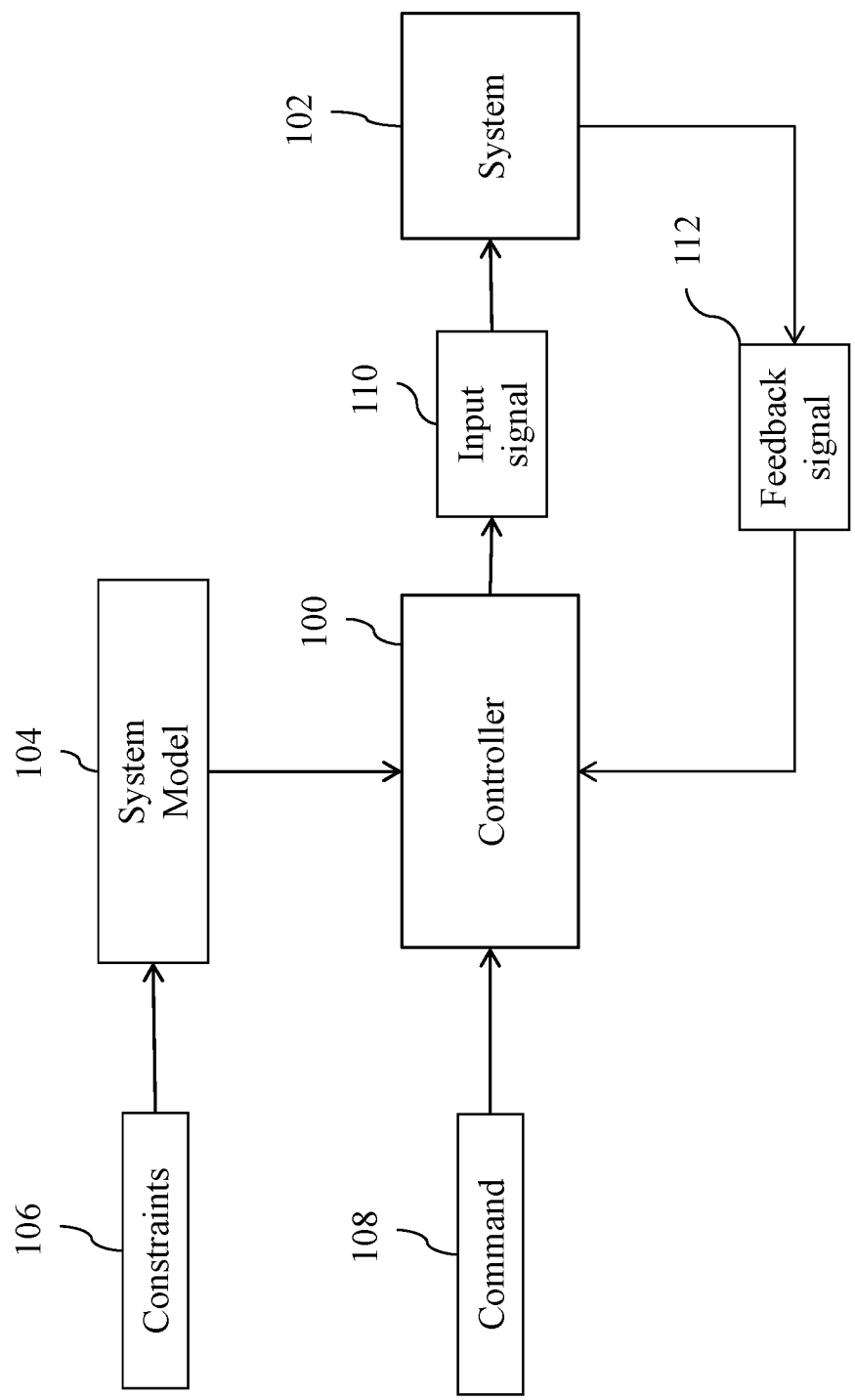
FIG. 1 illustrates a block diagram showing a controller to control an operation of a system, according to some embodiments of the present disclosure.

FIG. 1 illustrates a block diagram showing a controller 100 to control an operation of a system 102, according to some embodiments of the present disclosure. According to an embodiment, the controller 100 may be associated with system 102 to control the operation of the system 102 performing a task. In other words, the controller 100 may be operatively connected to system 102 to control the operation of system 102.

In an example embodiment, the controller 100 may be a model predictive control (MPC) programmed according to a model 104 (hereinafter, a dynamical model 104) of the system 102. The dynamical model 104 may be a set of equations representing changes in states and outputs of the system 102 over time as functions of current inputs, previous inputs, and previous outputs. The dynamical model 104 can include constraints 106 that represent physical and operational limitations of the system 102. During an operation of system 102, the controller 100 receives a command 108 indicating a desired behavior of the system 102. Command 108 may be, for example, a motion command. In response to receiving command 108, the controller 100 generates a sequence of control inputs that serves as an input signal 110 to the system 102. In response to the input signal 110, system 102 changes the states of system 102 according to the task. Further, system 102 may output a sequence of measurements as a feedback signal 112. For instance, one or more sensors installed in system 102 may output the feedback signal 112. In the sequence of measurements, each measurement can be indicative of the state of system 102 caused by the corresponding control input.

System 102, as referred to herein, can be any machine or device controlled by the certain manipulation input signal(s)

110 (i.e. the sequence of control inputs), possibly associated with physical quantities such as voltages, pressures, forces, torques, and to return feedback signal(s) 112, possibly associated to physical quantities such as current, flow, velocity, position indicative of the states of the system 102. The measurement values are related in part to previous measurement values of the system 102, and in part to previous and current control input values. The dependency on previous control inputs and previous measurements is encoded in the state of the system 102. The operation of system 102, e.g., a motion of components of the system 102, can include a sequence of measurements generated by the system 102 following the application of certain control input values.

The dynamical model 104 of system 102 may include a set of mathematical equations that describe how the system 102 measurements change over time as functions of current and previous control inputs and the previous measurements. The state of the system 102 is any set of information, in general time-varying, for instance, an appropriate subset of current and previous control inputs and measurements, that, together with the dynamical model 104 and future control inputs, can uniquely define the future motion of the system 102.

System 102 can be subject to physical limitations and specification constraints 106 limiting the range where the measurement, the control inputs, and also possibly the states of the system 102 are allowed to operate.

The controller 100 can be implemented in hardware or as a software program executed in a processor, e.g., a microprocessor, which at fixed or variable control period sampling intervals receives the feedback signal 112 and the command 108 and determines, using the feedback signal 112 and the command 108, the input signal 110 for controlling the operation the system 102.

Figure 2:
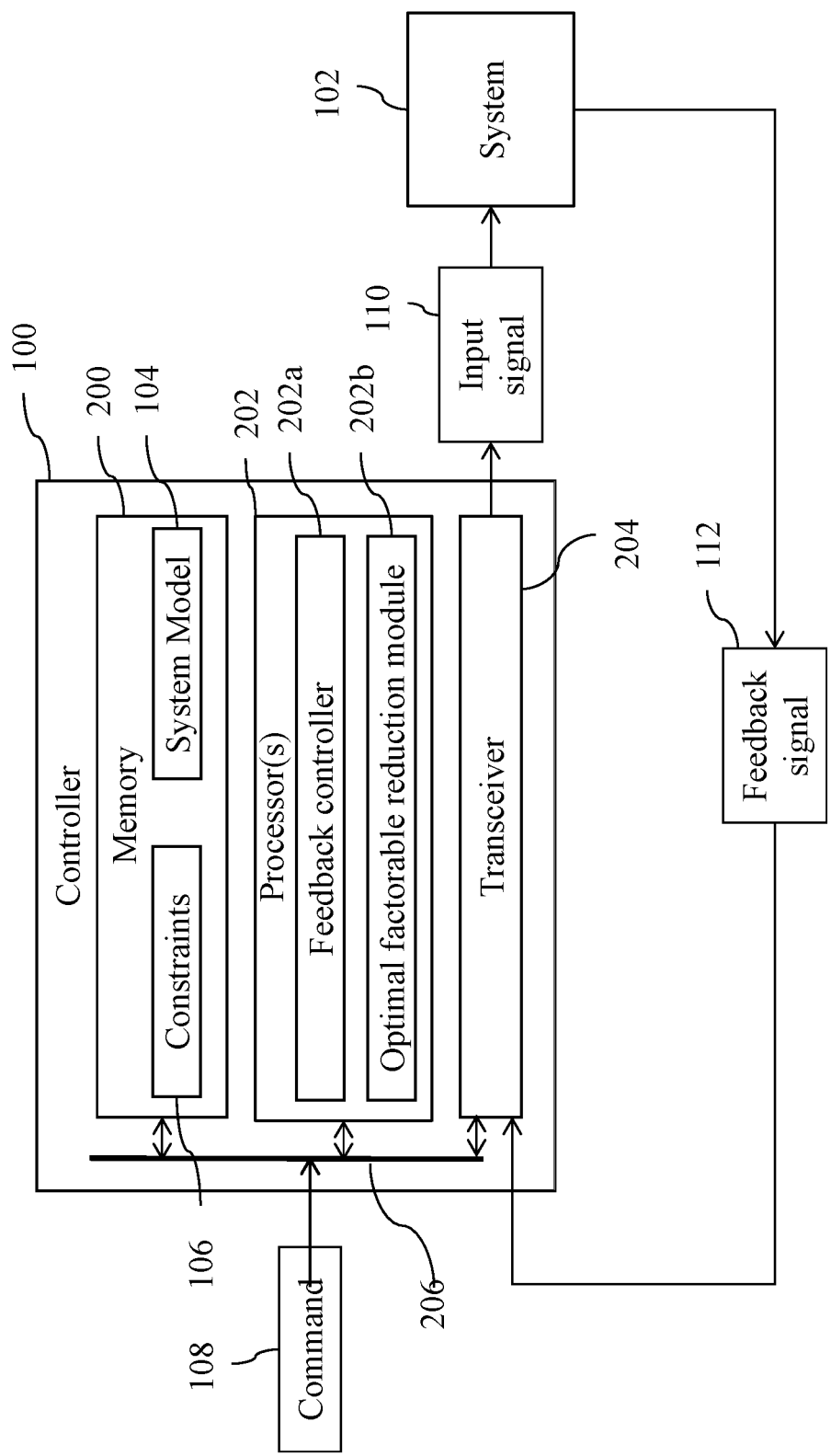
FIG. 2 illustrates a block diagram of the controller, according to some embodiments of the present disclosure.

FIG. 2 illustrates a block diagram of the controller 100, according to some embodiments of the present disclosure. The controller 100 includes a memory 200, at least one processor 202, a transceiver 204, and a bus 206. The memory 200 may be embodied as a storage media such as RAM (Random Access Memory), ROM (Read Only Memory), hard disk, or any combinations thereof. For instance, the memory 200 may store instructions that are executable by the at least one processor 202. Additionally, the memory 200 may store the constraints 106 of the system 102, and the dynamical model 104 of the system 102. The at least one processor 202 may be embodied as a single-core processor, a multi-core processor, a computing cluster, or any number of other configurations. The at least one processor 202 may be operatively connected to the memory 200 and/or the transceiver 204 via the bus 206. According to an embodiment, the at least one processor 202 may be configured as an optimal factorable reduction module 202a and/or a feedback controller 202b. Accordingly, the optimal factorable reduction module 202a and/or the feedback controller 202b may be embodied within the single-core processor, the multi-core processor, the computing cluster, or any number of other configurations.

The feedback controller 202a is configured to solve a polynomial optimization of a polynomial function. As used herein, the polynomial optimization may indicate a minimization of the polynomial function. As used herein, the polynomial function may be a function (one or more equations) in a form of a polynomial. For example, a function may be a polynomial, if the function does not include trigonometric terms, exponential terms, and/or logarithmic terms. For instance, the polynomial function may be a control policy of system 102. In this example case, the feedback controller 202a may solve a minimization of the control policy of system 102. As used herein, the control policy of system 102 may be a set of equations defined based on the system model 104 or may be a set of equations chosen as a choice to control system 102. For instance, the control policy is a function of the current state of system 102 and/or previous states of system 102. For instance, the control policy of system 102 may be a multilinear program or a mixed-integer nonlinear program.

For example, a minimization of the multilinear program may be mathematically represented as:

$$\min_{x \in X} f(x),$$

where the notation $x \in \mathbb{R}^n$, and may represent a set of n-dimensional real vectors, and the notation $X \subseteq \mathbb{R}^n$ is compact. The notation $f(x)$ is a function $f: \mathbb{R}^n \to \mathbb{R}$ and may be a polynomial. For instance, the polynomial function $f(x)$ may be mathematically represented as: $f(x) = \sum_{i=1}^m \alpha_i f_i(x)$. The notation $f_i(x)$ may represent a monomial of the polynomial. The monomial $f_i(x)$ may be mathematically represented as: $f_i(x) = \prod_{j=1}^n x_j^{d_{ij}}$. The notation $\alpha_i \in \mathbb{R}$ and the notation $d_{ij} \in \{0, 1\}$. For instance, the monomial $f_i(x)$ may be a multilinear monomial.

For example, a minimization of the mixed-integer nonlinear program may be mathematically represented as:

$$\min_{\substack{g(x,y) \leq 0 \\ h(x,y)=0 \\ x \in X, y \in Y}} f(x, y), \text{ where } X \subseteq \mathbb{R}^{n_x} \text{ and } Y \subseteq \{0, 1\}^{n_y}.$$

The notations $f(x, y)$, $g(x, y)$, $h(x, y)$ are continuous functions and may be polynomials. The notation x may be continuous. The notation y may be an integer variable.

It is also the objective of the feedback controller 202a to solve the polynomial optimization of the polynomial function with a reformulation derived by introducing additional variables. As used herein, the reformulation is a degree-reduced version of the polynomial function. Since the reformulation is derived by introducing the additional variables, the reformulation may be subjected to constraints on the structure of the additional variables.

In an example embodiment, the optimal factorable reduction module 202b may be configured to derive the reformulation for the polynomial function. According to an embodiment, to drive the reformulation for the polynomial function, the optimal factorable reduction module 202b may be configured to factorize the polynomial function. As used herein, the factorization may correspond to reducing the degree of the polynomial function to a target degree by introducing the additional variables.

Some embodiments are based on the realization that there may be multiple ways for factorizing the polynomial by introducing the additional variables, leading to multiple factorizations. To this end, the optimal factorable reduction module 202b may be configured to find all possible encodings of factorizations of the polynomial function and find an optimal solution among all possible encodings of factorizations of the polynomial function. In an example embodiment, to find the optimal solution, the optimal factorable reduction module 202b may be configured to solve a mixed-integer optimization problem such that the optimal solution reduces the degree of polynomial function till the target degree resulting in a size-constrained best-bound factorization. Accordingly, the mixed-integer optimization problem may be formulated as a problem to find the optimal solution among all possible encodings of the factorizations of the polynomial function such that the optimal solution reduces the degree of the polynomial function to the target degree resulting in a size-constrained best-bound factorization.

It is also an objective of the feedback controller 202a to determine, e.g., at each or some control steps, the current control input for controlling the system 102, based on the feedback signal including a current measurement of the current state of the system 102 by solving the polynomial optimization with the reformulation obtained from the optimal factorable reduction module 202b. In other words, to determine the current control input for controlling the system 102, the feedback controller 202a may solve the polynomial optimization with the reformulation obtained from the optimal factorable reduction module 202b using the feedback signal including the current measurement of the current state of the system 102. To this end, for the feedback signal including the sequence of measurements, the at least one processor 202 may be configured to determine the sequence of control inputs for the system 102.

According to an embodiment, the transceiver 204 may be configured to submit the sequence of control inputs as the input signal 110 to the system 102. Thereby, the system 102 may change the states of the system 102 according to the task. Further, the system 102 may output the feedback signal 112. To this end, the transceiver 204 may be further configured to receive the feedback signal 112. Further, the at least one processor 202 may be configured to determine the input signal 110. In this way, the controller 100 may control the operation of the system 102 performing the task, by submitting the input signal 110 and receiving the feedback signal 112. For instance, the optimal factorable reduction module 202b may derive the reformulation for the polynomial function, as explained in the detailed description of FIG. 3A to FIG. 3I.

Figure 3A:
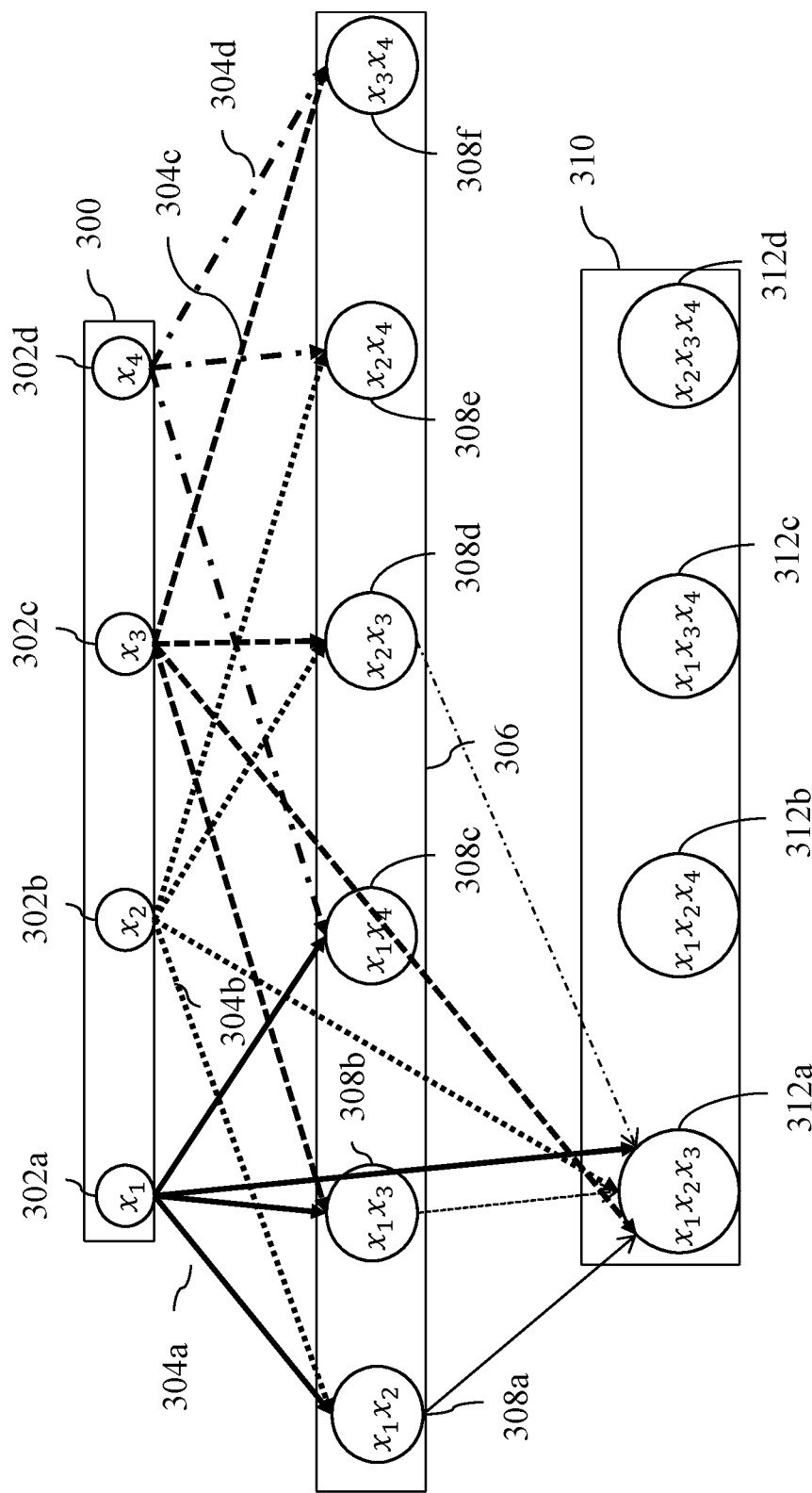
FIG. 3A illustrates a schematic diagram showing formulations of a first level and a second level of a decision diagram, according to some embodiments of the present disclosure.

FIG. 3A illustrates a schematic diagram showing formulations of a first level 300 and a second level 306 of a decision diagram, according to some embodiments of the present disclosure. FIG. 3A is explained in conjunction with FIG. 2. According to an embodiment, to derive the reformulation for the polynomial function, the optimal factorable reduction module 202b may be configured to set the target degree for reducing the degree of the polynomial function to the target degree. In an example embodiment, the degree of the polynomial function may be greater than the target degree. Accordingly, the optimal factorable reduction module 202b may derive the reformulation of the target degree by setting the target degree. According to an embodiment, the optimal factorable reduction module 202b may set the target degree, based on one or more of dynamics of the system 102, a number of variables in each multilinear monomial of the polynomial function (e.g. the control policy), and/or a user input. For instance, the optimal factorable reduction module 202b may set the target degree as a value of 'one', 'two', 'less than or equal to three', and the like, and accordingly may be configured to factorize the polynomial function to at least one of a bilinear programming reformulation, and a trilinear programming reformulation, respectively. As used herein, the bilinear programming reformulation may be an approximation of the polynomial function with a degree equals to or less than the value of 'two'. As used herein, the trilinear programming reformulation may be an approximation of the polynomial function with the degree equals to or less than the value of 'three'. For instance, the optimal factorable reduction module 202b may set the target degree for the polynomial function to the value of 'two' for deriving the bilinear programming reformulation.

According to an embodiment, to derive the bilinear programming reformulation, the optimal factorable reduction module 202b may be configured to represent each multilinear monomial in the polynomial function as a decision diagram. In an example embodiment, the optimal factorable reduction module 202b may represent each multilinear monomial (fi (x)) as the decision diagram such that the decision diagram encodes every possible factorization of the corresponding multilinear monomial.

For purpose of explanation, considering a monomial $f_1(x)=\Pi_{j=1}^{4} x_j^{d_{1j}}=x_1 x_2 x_3 x_4$. For instance, to represent the monomial $x_1 x_2 x_3 x_4$ with the decision diagram, the optimal factorable reduction module 202b may formulate a first level 300 such the first level 300 includes a plurality of leaf nodes 302a, 302b, 302c, and 302d, where each leaf node corresponds to a variable (also referred to as an original variable) in the monomial $x_1 x_2 x_3 x_4$. For instance, the optimal factorable reduction module 202b may formulate the first level 300 with four leaf nodes 302a, 302b, 302c, and 302d, since the monomial $x_1 x_2 x_3 x_4$ includes four variables (four original variables). Further, the optimal factorable reduction module 202b may formulate a second level 306 such the second level 306 includes a plurality of parent nodes 308a, 308b, 308c, 308d, 308e, and 308f. Each parent node of the second level 306 corresponds to an intermediate monomial of degree 'two'. The intermediate monomial of degree 'two' is a bilinear product of the variables represented by at least two leaf nodes of the first level 300. For example, an intermediate monomial $x_1 x_2$ is the bilinear product of the variables $x_1$ and $x_2$ represented by the leaf node 302a and the leaf node 302b respectively. In other words, each parent node of the second level 306 is formulated as a combination of at least two variables of the monomial $x_1 x_2 x_3 x_4$. In an example embodiment, the intermediate monomials represented by the plurality of parent nodes 308a, 308b, 308c, 308d, 308e, and 308f may also be defined by arcs 304a, 304b, 304c, and 304d. For instance, an arc may connect two nodes of two different layers. For instance, the intermediate monomial $x_1 x_2$ (represented by the parent node 308a) may be defined by the arc 304a and the arc 304b. Furthermore, the optimal factorable reduction module 202b may formulate a third level 310, as illustrated in FIG. 3B.

Figure 3B:
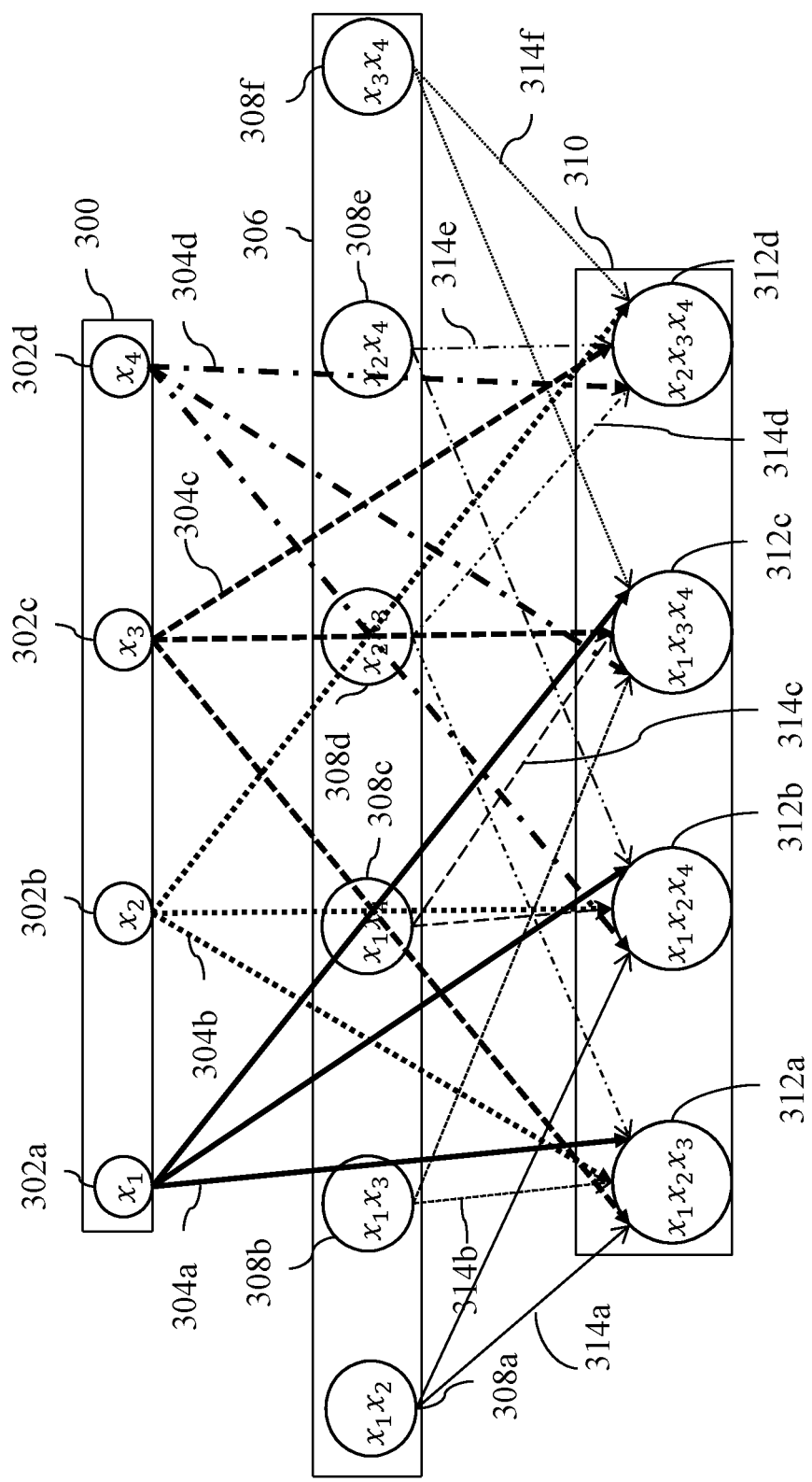
FIG. 3B illustrates a schematic diagram showing a formulation of a third level of the decision diagram, according to some embodiments of the present disclosure.

FIG. 3B illustrates a schematic diagram showing a formulation of the third level 310 of the decision diagram, according to some embodiments of the present disclosure. FIG. 3B is explained in conjunction with FIG. 3A. In FIG. 3B, for illustration purpose, the arcs 304a, 304b, 304c, and 304d defining the intermediate monomials represented by the plurality of parent nodes 308a, 308b, 308c, 308d, 308e, and 308f are not shown, however, FIG. 3B may also include the arcs 304a, 304b, 304c, and 304d defining the intermediate monomials represented by the plurality of parent nodes 308a, 308b, 308c, 308d, 308e, and 308f. According to an embodiment, the optimal factorable reduction module 202b may formulate the third level 310 such that the third level 310 includes a plurality of parent nodes 312a, 312b, 312c, and 312d. Each parent node of the third level 310 corresponds to an intermediate monomial of degree 'three'. The intermediate monomial of degree 'three' is a bilinear product of the intermediate monomial represented by the parent node of the second level 306 and the variable represented by at least one leaf node of the first level 300. For example, the intermediate monomial $x_1x_2x_3$ (represented by the parent node 312a) may be at least one of: the bilinear product of the intermediated monomial $x_1x_2$ and the variable $x_3$; the bilinear product of the intermediated monomial $x_1x_3$ and the variable $x_2$; or the bilinear product of the intermediated monomial $x_2x_3$ and the variable $x_1$. Alternatively, the intermediate monomial of degree 'three' is a trilinear product of three variables represented by the leaf nodes 302a, 302b, 302c, and 302d. In an example embodiment, the intermediate monomials (represented by the plurality of parent nodes 312a, 312b, 312c, and 312d) may also be defined by the arcs 304a, 304b, 304c, and 304d and arcs 314a, 314b, 314c, 314d, 314e, and 314f. For instance, the intermediate monomial $x_1x_2x_3$ may be defined by a combination of the arc 314a and the arc 304c, a combination of the arc 314b and 304b, or a combination of the arc 304a and the arc 314d. Furthermore, the optimal factorable reduction module 202b may formulate a fourth level 316, as illustrated in FIG. 3C.

Figure 3C:
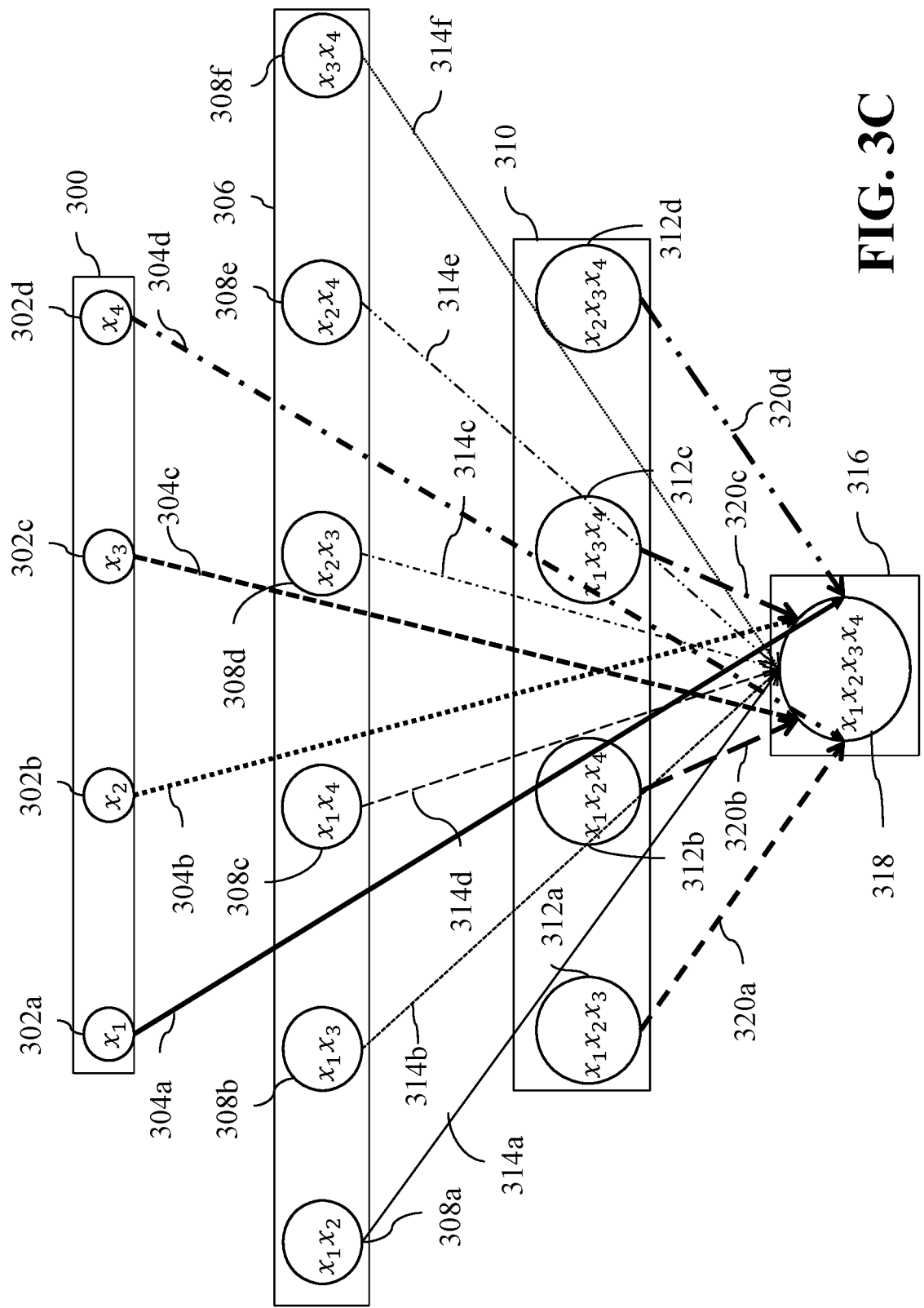
FIG. 3C illustrates a schematic diagram showing a formulation of a fourth level of the decision diagram, according to some embodiments of the present disclosure.

FIG. 3C illustrates a schematic diagram showing a formulation of a fourth level 316 of the decision diagram, according to some embodiments of the present disclosure. FIG. 3C is explained in conjunction with FIG. 3B. In FIG. 3C, for illustration purposes, the arcs 304a, 304b, 304c, and 304d and the arcs 314a, 314b, 314c, 314d, 314e, and 314f define the intermediate monomial represented by a plurality of parent nodes 312a, 312b, 312c, and 312d are not shown, however FIG. 3c may include the arcs 304a, 304b, 304c, and 304d, and the arcs 314a, 314b, 314c, 314d, 314e, and 314f defining the intermediate monomials represented by the plurality of parent nodes 312a, 312b, 312c, and 312d.

According to an embodiment, the optimal factorable reduction module 202b may formulate the fourth level 316 such that the fourth level 310 includes a node 318, where the node 318 may be a bilinear product of the intermediate monomial of degree 'three' and the variable represented by the at least one leaf node or a bilinear product of two intermediate monomial of degree 'two'. In an example embodiment, the multilinear monomial $x_1x_2x_3x_4$ may be defined by the arcs 304a, 304b, 304c, and 304d, the arcs 314a, 314b, 314c, 314d, 314e, and 314f, and arcs 320a, 320b, 320c, and 320d. For instance, the multilinear monomial $x_1x_2x_3x_4$ may be defined by at least one of: the arcs 320a and 304c, the arcs 320b and 304c, the arcs 320c and 304b, the arcs 320d and 304a, the arcs 314a and 314f, the arcs 314b and 314e, or the arcs 314c and 314d. In an example embodiment, the optimal factorable reduction module 202b may stop the formulation of the layers, when a most recent formulated layer includes a node that represents the multilinear monomial of the polynomial function. The node 318 representing the multilinear monomial of the polynomial function may be referred to as a root node. For instance, the decision diagram of the multilinear monomial $x_1x_2x_3x_4$ is as illustrated in FIG. 3D.

Figure 3D:
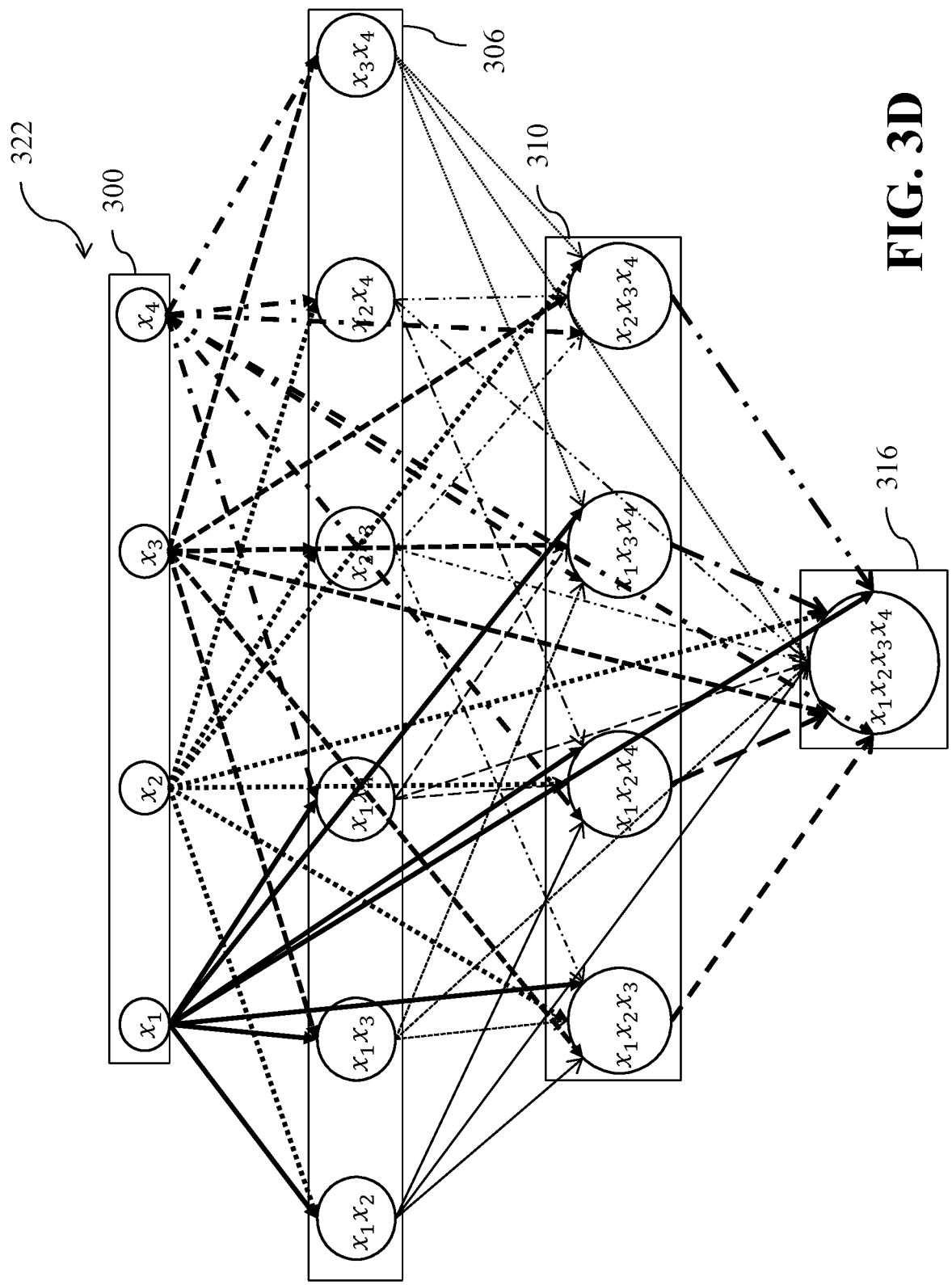
FIG. 3D illustrates a schematic diagram showing the decision diagram of a monomial, according to some embodiments of the present disclosure.

FIG. 3D illustrates a schematic diagram showing a decision diagram 322 of the multilinear monomial $x_1x_2x_3x_4$, according to some embodiments of the present disclosure. FIG. 3D is explained in conjunction with FIG. 3A, FIG. 3B, and FIG. 3C. According to an embodiment, the decision diagram 322 encodes the every possible factorization of the multilinear monomial $x_1x_2x_3x_4$ of the polynomial function. For instance, the decision diagram 322 may be mathematically constructed as below.

Considering, a set $J_i=\{j|x_j$ occurs in $f_i(x)\}$ for all $i=1, \ldots, m$, where the notation $f_i(x)$ may be the multilinear monomial. A set of nodes $\mathcal{N}_i$ in $\mathcal{D}_i$ are arranged in $|J_i|$ layers, where $\mathcal{D}_i$ is the decision diagram. Each node $n \in \mathcal{N}_i$ is associated with two functions, layer$_i$: $\mathcal{N}_i \to \{1, \ldots, |J_i|\}$ denoting the layer to which the node n belongs and deg$_i$: $\mathcal{N}_i \to \{0,1\}^n$ denoting the bilinear product that is represented by the node n. Accordingly, a layer l of $\mathcal{D}_i$ includes all possible bilinear products of degree equal to l using indices in $J_i$. Thereby, the layer l has $\binom{|J_i|}{l}$ nodes. The layer $l=|J_i|$ represent the multilinear monomial $f_i(x)$.

The nodes in $\mathcal{N}_i$ are connected by a set of hyper-arcs $\mathcal{H}_i$. Each hyper-arc $h \in \mathcal{H}_i$ is associated with three functions tail1$_i$, tail2$_i$, and head$_i$ that each map $\mathcal{H}_i \to \mathcal{N}_i$. For instance, a hyper-arc $h \in \mathcal{H}_i$ exists if and only if deg$_i$(tail1$_i$(h))+deg$_i$(tail2$_i$(h))=deg$_i$(head$_i$(h)). Each hyper-arc h represents the bilinear product between two nodes represented by tail1$_i$(h) and tail2$_i$(h), leading to a bilinear product (e.g. a parent node or a root node) represented by head$_i$(h). A set of hyper-arcs that incidents on a node n is denoted by In(n)= $\{h|$head$_i$(h)$\}$.

A set of arcs in $\mathcal{D}_i$ is denoted by $A_i$ i.e. $A_i=\{(n_1, n_2)|n_1, n_2 \in \mathcal{N}_i$ and $n_i \in \{$tail1$_i$(a), tail2$_i$(h)$\}$, $n_2=$head$_i$(h), for some $h \in \mathcal{H}_i\}$. A subgraph in $\mathcal{D}_i$ is denoted by G. The subgraph $G \subseteq \mathcal{D}_i$ may be a rooted tree that includes nodes $(G) \subseteq \mathcal{N}_i$ and arcs $A(G)=A_i \cap (\mathcal{N}(G) \times \mathcal{N}(G))$ such that there exists a $\mathcal{H}' \subseteq \mathcal{H}_i$ satisfying:

$$A(G)=U_{h \in \mathcal{H}_i'} \{(\text{tail1}_i(h),\text{head}_i(h)),(\text{tail2}_i(h),\text{head}_i(h))\}$$ Equation (1).

According to an embodiment, the subgraph $G \subseteq \mathcal{D}_i$ may be a representation of an in-tree (also referred to as an in-tree representation). In an example embodiment, if the subgraph G is the in-tree representation, then the subgraph G may represent one possible factorization of the monomial $f_i(x)$. In other words, every possible factorization of the monomial $f_i(x)$ may read on the representation of the in-tree. Accordingly, if the subgraph G is the in-tree representation, then the subgraph G may represent one possible factorization of the monomial $f_i(x)$. For instance, an exemplary subgraph representing one possible factorization of the monomial $f_i(x)$ is as illustrated in FIG. 3E and FIG. 3F.

Figure 3E:
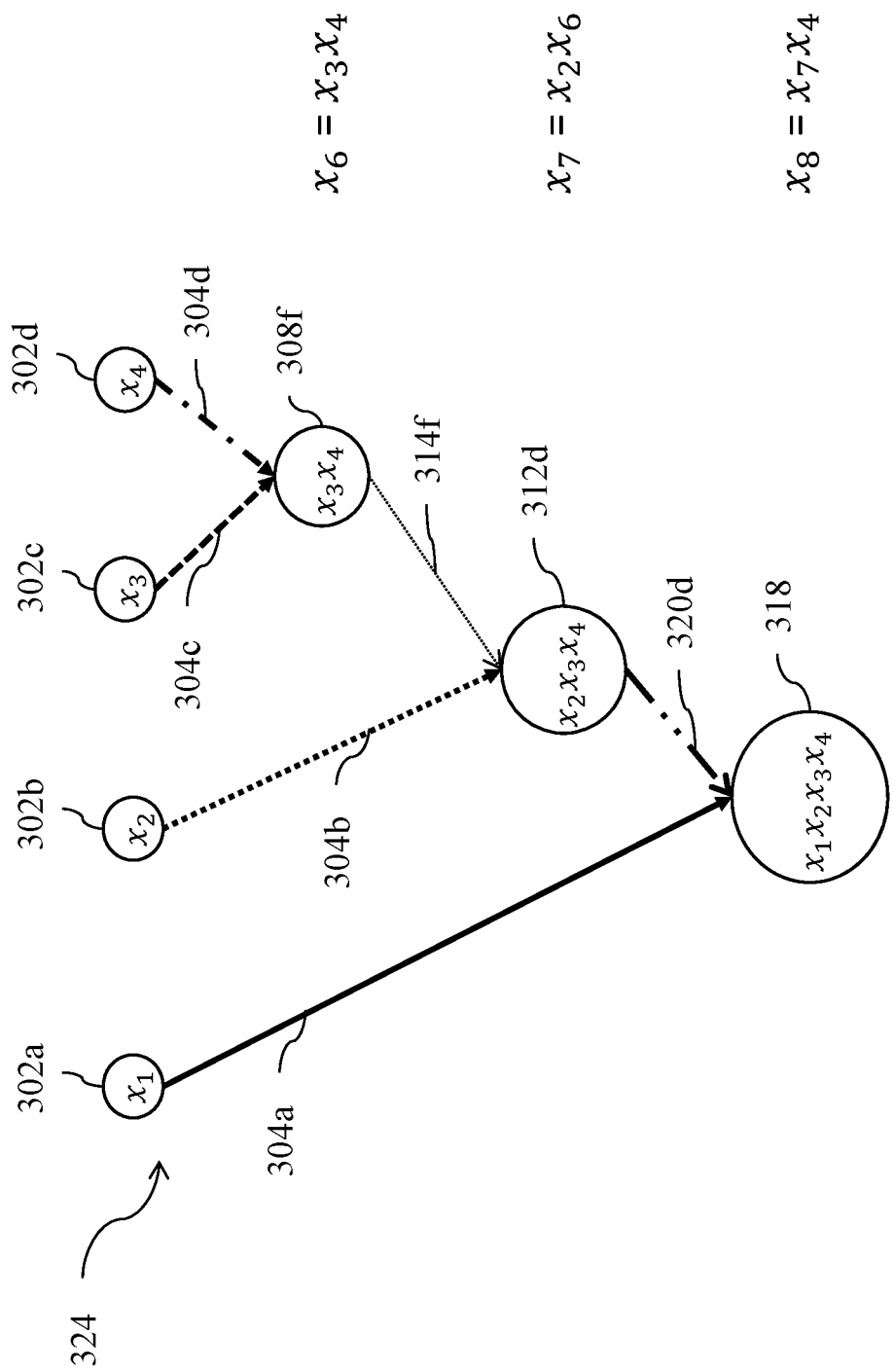
FIG. 3E illustrates an exemplary subgraph representing one possible factorization of the monomial, according to some embodiments of the present disclosure.
Figure 3F:
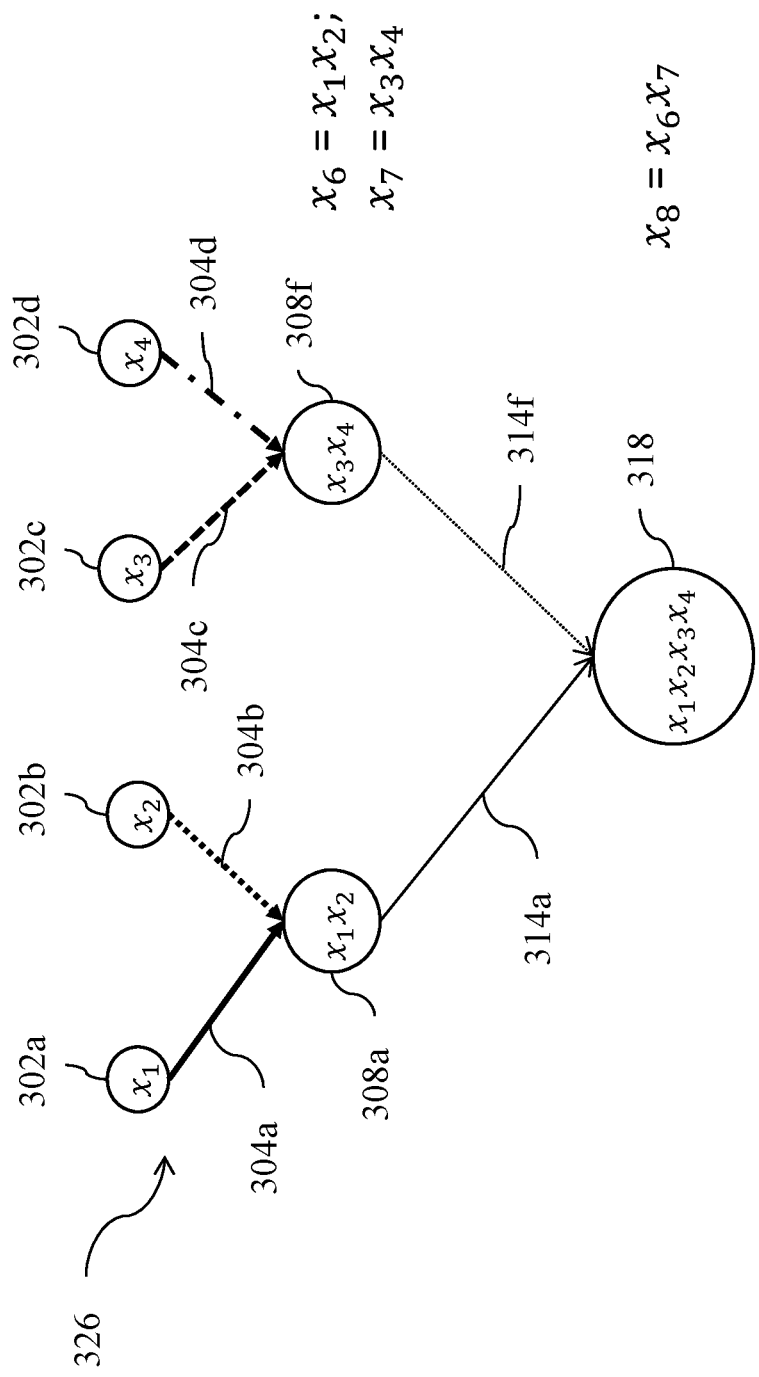
FIG. 3F illustrates an exemplary subgraph representing another possible factorization of the monomial, according to some embodiments of the present disclosure.

FIG. 3E illustrates an exemplary subgraph representing one possible factorization of the monomial $f_i(x)$, according to some embodiments of the present disclosure. FIG. 3E is explained in conjunction with FIG. 3A, FIG. 3B, FIG. 3C, and FIG. 3D. For purpose of explanation, considering the monomial $f_1(x)=\Pi_{j=1}^{4} x_j^{d_{1j}}=x_1x_2x_3x_4$. According to an embodiment, the subgraph $G \subseteq \mathcal{D}_i$ is the in-tree representation, if the subgraph G is the rooted tree having properties of the in-tree representation. In an example embodiment, the properties of the in-tree representation may include: (i.) a root of the in-tree corresponds to the original monomial $(f_i(x)=\Pi_{j \in J_i} x_j)$ of the polynomial function; (ii.) leaf nodes of the in-tree correspond to the original variables of the original monomial; (iii.) every node other than the leaf nodes has two child nodes each of which represents a monomial; and (iv.) a product of the monomials of the child nodes equals a monomial represented by a parent node of the child nodes. For instance, a subgraph 324 (illustrated in FIG. 3E) includes the root representing the monomial $f_1(x)=x_1x_2x_3x_4$ and the leaf nodes 302a, 302b, 302c, 302d that correspond to the original variables ($x_1$, $x_2$, $x_3$, $x_4$ respectively) of the monomial $f_1(x)=x_1x_2x_3x_4$. Further, the subgraph 324 includes the parent nodes 308f and 312d and the root node 318. For instance, the parent node 308f has two child nodes (i.e. the leaf nodes 302c and 302d), where the leaf nodes 302c and 302d represent a monomial $x_3$ of degree 'one' and a monomial $x_4$ of degree 'one' respectively. A product of the monomial $x_3$ and the monomial $x_4$ may be equal to a monomial $x_3x_4$ of degree 'two' of the parent node 308f. In an example embodiment, the product of the monomial $x_3$ and the monomial $x_4$ may be represented by the arcs 304c and 304d, where the arcs 304c and 304d together may formulate the hyper-arc. Similarly, the parent node 312d has two child nodes (i.e. the leaf node 302b and the parent node 308f) and a product of monomials represented by the leaf node 302b and parent node 312d is a monomial of the parent node 312d. Similarly, the rode node 318 has two child nodes (i.e. the leaf node 302a and the parent node 312d) and a product of monomials represented by the leaf node 302a and the parent node 312d is the monomial of the root node 318. Accordingly, the subgraph 324 is the in-tree representation. Further, when the subgraph G is the in-tree representation, the subgraph G represents the factorization of the monomial $f_i(x)$, which is mathematically shown as below.

Since the subgraph G⊆$\mathcal{D}_i$, there exists a unique set $\mathcal{H}' \subseteq \mathcal{H}_i$ such that equation (1) is satisfied. By definition, the subgraph G is the rooted tree with each leaf representing $x_j$ for $j \in J_i$ and the root representing $f_i(x)$. Since the subgraph G is the in-tree representation, every node n except the root has a unique parent node n' such that (n, n')∈A(G). Thus, there exists a unique path from all nodes in (G) to the root. Further, a union of the arcs from $x_j$ for $j \in J_i$ to the root is A(G). Thus, the subgraph G represents the factorization of the monomial $f_i(x)$.

In an example embodiment, the path may define different additional variables factorizing the monomial $f_i(x)$. For instance, as illustrated in FIG. 3E, the path may define three different additional variables $x_6$, $x_7$, $x_8$ that factorizes the monomial $f_i(x)$. According to an embodiment, each of the additional variables $x_6$, $x_7$, $x_8$ may be a product of the original variables of the monomial $f_i(x)$ of the polynomial function and/or may be a product of an intermediate additional variable and the original variable of the monomial $f_i(x)$ of the polynomial function. For instance, the additional variable $x_6$ may be the product of the original variables $x_3$ and $x_4$ of the monomial $f_i(x)=x_1, x_2, x_3, x_4$; and the additional variable $x_7$ may be the product of the original variable $x_3$ of the monomial $f_i(x)$ and the additional variable $x_6$. Hereinafter, an additional variable that does not represent the monomial $f_i(x)$ of the polynomial function may be referred to as an intermediate additional variable. For instance, the additional variable $x_6$ and the additional variable $x_7$ may be referred to as the intermediate additional variables. Accordingly, the additional variable $x_8$ may be the product of the original variable $x_4$ of the monomial $f_i(x)$ and the intermediate additional variable $x_7$.

FIG. 3F illustrates an exemplary subgraph representing another possible factorization of the monomial $f_i(x)$, according to some embodiments of the present disclosure. FIG. 3F is explained in conjunction with FIG. 3E. For purpose of explanation, considering the monomial $f_1(x)=\Pi_{j=1}^{4} x_j^{d_{1j}}=x_1x_2x_3x_4$. As illustrated in FIG. 3F, a subgraph 326 may be the rooted tree that includes the root representing the monomial $f_1(x)=x_1x_2x_3x_4$. Further, the subgraph 326 may include the leaf nodes 302a, 302b, 302c, 302d that correspond to the original variables ($x_1$, $x_2$, $x_3$, $x_4$ respectively) of the monomial $f_1(x)=x_1x_2x_3x_4$. Furthermore, the subgraph 326 may include the parent nodes 308a and 308f and the root node 318. For instance, the parent node 308a has two child nodes (i.e. the leaf nodes 302a and 302b), where the leaf nodes 302a and 302b represent a monomial $x_1$ of degree 'one' and a monomial $x_2$ of degree 'one' respectively. A product of the monomial $x_1$ and the monomial $x_2$ may be equal to a monomial $x_1x_2$ of degree 'two' of the parent node 308a. In an example embodiment, the product of the monomial $x_1$ and the monomial $x_2$ may be represented by the arcs 304a and 304b, where the arcs 304a and 304b together may formulate the hyper-arc. Similarly, the parent node 308f has two child nodes (i.e. the leaf nodes 302c and 302d) and a product of monomials represented by the leaf nodes 302c and 302d is a monomial of the parent node 308f. Similarly, the rode node 318 has two child nodes (i.e. the parent nodes 308a and 308f) and a product of monomials represented by the parent nodes 308a and 308f is the monomial of the root node 318. Thereby, the subgraph 326 is the in-tree representation.

Since the subgraph 326 is the in-tree representation, the subgraph 326 may represent one possible factorization of the monomial $f_i(x)$ of the polynomial function. In an example embodiment, the path from the leaf nodes 302a, 302b, 302c, and 302d to the root node 318 may define additional variables factorizing the monomial $f_i(x)$ of the polynomial function. For instance, as illustrated in FIG. 3F, the path may define three different additional variables $x_6$, $x_7$, $x_8$ that factorizes the monomial $f_i(x)$. According to an embodiment, each of the additional variables $x_6$, $x_7$, $x_8$ may be a product of the original variables of the monomial $f_i(x)$ of the polynomial function and/or may be a product of intermediate additional variables ending with a product of at least two of the original variables of the monomial $f_i(x)$ of the polynomial function. For instance, the intermediate additional variable $x_6$ may be the product of the original variables $x_1$ and $x_2$ of the monomial $f_1(x)=x_1 x_2 x_3 x_4$; and the intermediate additional variable $x_7$ may be the product of the original variables $x_3$ and $x_4$ of the monomial $f_1(x)=x_1 x_2 x_3 x_4$. The additional variable $x_8$ may be the product of the intermediate additional variable $x_6$ and the intermediate additional variable $x_7$. Referring to FIG. 3E and FIG. 3F, the factorizations represented by the subgraphs 324 and 326 introduce same number of additional variables, however the factorization represented by the subgraph 324 introduces additional variables whose structures are different from structures of the additional variables introduced by the factorization represented by the subgraph 324. For instance, a structure of an additional variable may indicate a product of original variables, a product of at least one intermediate additional variable and at least one original variable, and/or a product of intermediate additional variables.

Referring back to FIG. 3D, the decision diagram $\mathcal{D}_i$ may also be the in-tree representation, since the decision diagram $\mathcal{D}_i$ satisfy the properties of the in-tree representation. According to an embodiment, the decision diagram $\mathcal{D}_i$ (e.g. the decision diagram 322) encodes all possible factorizations of the monomial $f_i(x)$ (e.g. $f_1(x)=x_1 x_2 x_3 x_4$) through collections of the paths defined by the subgraphs (similar to the subgraphs 324 and 326).

For any $i \in [m]$ where $[m]=\{1, \ldots, m\}$, let $N_i=\{J: J \subseteq J_i, J \neq \emptyset\}$ be the family of non-empty subsets of indices of the variables in monomial i, and let $N=U_{i \in [m]} N_i$. For any J" in N such that |J"|≥2, a triple t=(J,J',J") describes a partition of J" into two non-empty sets J and J' such that $j \cap J' = \emptyset$ and $J \cup J' = J"$. We assume that the first two elements of any triple are arranged in lexicographical order. In this way, we can uniquely define tail1(t), tail2(t), and head(t) as the first, second, and third element of t, respectively. Finally, let $T_i\{t: head(t) \in N_i\}$ and $T=U_{i \in [m]} T_i$ be the set of all possible triples associated with N and $N_i$, respectively, and let tails(t){tail1(t), tail2(t)}.

A Proper Triple Set for an MLP is a set of triples T'⊆T for which there exists a subset T"⊆T satisfying the following conditions:

PTS1. Every set $J_i$ with $|J_i|>1$ is the third element of a triple $t \in T'$; and PTS2. If a set J such that $|J|>1$ is the first or second element of a triple $t \in T'$, then J is the third element of a different triple in T'.

A proper triple set T defines a Recursive McCormick Relaxation (RML) of an MLP over the set of variables $y_J$ for each J in $\{\text{head}(t): t \in T\}$ and subject to the convex and concave envelopes of $\varepsilon(t)$ associated with each triple t in T. Observe that Condition 1 enforces the linearization of all monomials of two or more variables, and Condition 2 extends the same condition to artificial variables, which always represent the product of two or more original variables.

The following presents a MIP formulation for the identification of minimum-size RML s, whose feasible solutions form a bijection with the collection of RML s for an arbitrary MLP.

$$\min \Sigma_{t \in T} v_t \qquad \text{Equation (2a)}$$

$$\text{s.t. } \Sigma_{t \in T_i: \text{head}(t)=J_i} u_{i,t} = 1 \, \forall i \in [m] \text{ with} |J_i|>1, \qquad \text{Equation (2b)}$$

$$\Sigma_{t \in T_i: \text{head}(t)=J} u_{i,t} = \Sigma_{t \in T_i: J \in \text{tails}(t)} u_{i,t} \, \forall i \in [m], \forall J \in N_i: \\ 2 \leq |J| \leq |J_i|, \qquad \text{Equation (2c)}$$

$$u_{i,t} \leq v_t \, \forall t \in T_i, i \in [m], \qquad \text{Equation (2d)}$$

$$u_i \in \mathbb{B}^{|T_i|} \forall i \in [m], \qquad \text{Equation (2e)}$$

$$v \in \mathbb{B}^{|T|} \qquad \text{Equation (2f)}$$

The variables of our model are $u_i \in \mathbb{B}^{|T_i|}$ and $v \in \mathbb{B}^{|T|}$, where:

$u_{i,t}$ indicates whether triple t is used in the exact linearization of monomial i; and $v_t$ indicates whether the triple t can be used in the exact linearization of any monomial $i \in [m]$.

These variables are used to represent the selection of the triples composing a proper triple set T. Variables $u_{i,t}$ are used to select a linearization of monomial i, and variables $v_t$ indicate that a triple belongs to T' and can be used in the linerization of one or more monomials in [m].

The constraints (9)-(10) model conditions 1 and 2, respectively. Namely, if the index set $J_i$ of monomial i containing two or more elements, then $\text{head}(t)=J_i$ for at least one triple used in the linearization of i. Similarly, if some index set J containing two or more elements is such that $j \in \text{tails}(t)$ for some selected triple t, then there must exist another selected triple t' such that $j=\text{head}(t')$. The constraints (11) couple variables $u_{i,t}$ and $v_t$, i.e., if we use t in the linearization of some triple t, then we must set $v_t$ to one. Finally, the objective function 8 minimizes the number of activated triples across the entire MLP.

Finally, observe that the variables $v_t$ are necessary in our formulation because a triple $t=(J,J',J'')$ used in the linearization of a monomial i may not be used in the linearization of another monomial i' even if both j and J' belong to $J_{i'}$. Observe that this is in agreement with the definition of proper triple sets, which allows a triple set T to contain not only a subset that establishes conditions PTS1 and PTS2, but also to include other triples.

The choice of v, $u_i$ satisfying Equation (2) defines an in-tree for the decision diagram $\mathcal{D}_i$. If the choice of v is such that v, $u_i$ is feasible for every i, then the v defines a in-tree in every decision diagram corresponding to each monomial.

Given a proper triple set T for an MLP, the associated RML is given by $$\min \Sigma_{i \in [m]} \alpha_i y_{J_i} \qquad \text{Equation (3)}$$

$$\text{s.t. } \varepsilon(t), \, \forall t \in T$$

$$y_J \in [0,1], \, \forall J \in N.$$

where $\varepsilon(t)$ with $t=(j_1,j_2, \{j_1,j_2\})$ denote the McCormick inequality system representing the convex and concave envelopes that linearizes the bilinear product $x_{j_1} x_{j_2}$ by introducing an auxiliary variable $y_{\{j_1,j_2\}}$ $$y_{\{j_1,j_2\}} \geq 0$$

$$y_{\{j_1,j_2\}} - x_{j_1} - x_{j_2} + 1 \geq 0$$

$$y_{\{j_1,j_2\}} - x_{j_1} \leq 0$$

$$y_{\{j_1,j_2\}} - x_{j_2} \leq 0$$

To simplify the notation, the variable $x_j$ is also referred as $y_{\{j\}}$. Therefore, the variables in the models are given by $y_J$, where j is an index set $J \subseteq [n]$.

Finally, the size of a RML refers to the cardinality of the associated proper triple set T.

Let $\hat{v} \in \mathbb{B}^{|T|}$ be a binary indicator vector representing proper triple sets T, i.e., $\hat{v}_t=1$ if and only if $t \in T$. For a given $\hat{v} \in \mathbb{B}^{|T|}$, the RML in Equation (3) can be rewritten as the following linear program (LP):

$$\min_{y \in [0,1]^{|N|}} \Sigma_{J \in N} \beta_J y_J \qquad \text{Equation (4a)}$$

$$\text{s.t. } \underbrace{\begin{pmatrix} -1 & 0 & 1 \\ 0 & -1 & 1 \\ 1 & 1 & -1 \end{pmatrix}}_{B} \underbrace{\begin{pmatrix} y_J \\ y_{J'} \\ y_{J''} \end{pmatrix}}_{y_t} \leq \underbrace{\begin{pmatrix} 1 \\ 1 \\ 2 \end{pmatrix}}_{b} + \underbrace{\begin{pmatrix} -1 \\ -1 \\ -1 \end{pmatrix}}_{c} \hat{v}_t, \forall t \in T \qquad \text{Equation (4b)}$$

$$y_J \leq 1 \forall J \in N \qquad \text{Equation (4c)}$$

Coefficient $\beta_J = \alpha_i$ if $J=J_i$ for some $i \in [m]$ and $\beta_J=0$ otherwise.

Let $\lambda_t = (\lambda_{t,1}, \lambda_{t,2}, \lambda_{t,3})$ denote the vector with the dual multipliers for the three inequalities in (15) associated with the triple t. Let $\mu_J$ denote the multiplier for the bound constraint $y_J \leq 1$ in Equation (4c) associated with the index set J. Moreover, let $\lambda$ be a vector containing $\lambda_t$ for all $t \in T$, and $\mu$ denote the collection of multipliers $\mu_J$ for all $j \in N$. Finally, let $\Lambda$ and $\mu$ denote the domains of $\lambda$ and $\mu$, respectively. The dual of Equation (4) can be written as follows:

$$\max_{(\lambda,\mu) \in \Lambda \times U} Obj(\lambda, \mu) - \Sigma_{t \in T} \left( b^T \lambda_t + c^T \lambda_t \hat{v}_t \right) - \Sigma_{J \in N} \mu_J \qquad \text{Equation (5a)}$$

$$\text{s.t. } \beta_J + \sum_{t: J=tail1(t)} (-\lambda_{t,1} + \lambda_{t,3}) + \sum_{t: J=tail2(t)} (-\lambda_{t,2} + \lambda_{t,3}) + \qquad \text{Equation (5b)}$$

$$\Sigma_{t: J=head(t)} (\lambda_{t,1} + \lambda_{t,2} - \lambda_{t,3}) + \mu_J \geq 0 \forall J \in N$$

$$\lambda, \mu \geq 0 \qquad \text{Equation (5c)}$$

The optimal multipliers $\lambda^{\hat{v}}$ and $\mu^{\hat{v}}$ can be bounded independent of $\hat{v}$. Namely, an optimal solution $\lambda^{\hat{v}}$, $\mu^{\hat{v}}$ to (5) satisfies $\lambda_{t,j}^{\hat{v}} \leq M_{t,j}$ for all $t \in T$, $j=1,2,3$ with $M_{t,j} \in [0, \infty)$ and $\mu_J^{\hat{v}} \leq M_J$ for all $J \in N$ with $M_J \in [0, \infty)$. In the remaining $\hat{v}$ is fixed and omit it from the notation for brevity.

The optimal objective value of Equation (5) lies in the interval $[-\eta, 0]$ where $\eta = -\Sigma_{i \in [m]} \min(0, \alpha_i)$. It can be shown that $M_{t,3} = \eta$ for all t in T and $M_J = \eta$ for all J in N.

The bounds $M_{t,j}$ for all $t \in T$, $j=1,2$ can be derived as follows.

Consider the third inequality in (4b) for $J \in N$. This can be simplified to $$\Sigma_{t:J=tail1(t)}\lambda_{t,1}^{\hat{v}} + \Sigma_{t:J=tail2(t)}\lambda_{t,2}^{\hat{v}} \leq \beta_J + \eta + \Sigma_{t:J=head(t)}(\lambda_{t,1}^{\hat{v}} + \lambda_{t,2}^{\hat{v}} - \lambda_{t,3}^{\hat{v}}) \leq \beta_J + \eta + \Sigma_{t:J=head(t)}(\lambda_{t,1}^{\hat{v}} + \lambda_{t,2}^{\hat{v}})$$

Equation (6)

Observe that the right hand side of (6) involves the multipliers $\lambda_{t,1}^{\hat{v}}$ and $\lambda_{t,2}^{\hat{v}}$ for all t such that J=head(t) i.e., the triples t for which J is the head. If an upper bound is available for such multipliers then Equation (39) can be used to derive an upper bound on the arcs in which J is a tail. In the following an iterative procedure is used to construct the bounds $M_{t,1}$ and $M_{t,2}$.

First, consider $\mathcal{J}_1 = \{J \in N | |J|=1\}$. Set, $M_{t,1} \leq \beta_J + \eta$ and $M_{t,2} \leq \beta_J + \eta$ for each t in T such that tail1(t)$\in \mathcal{J}_1$ or tail2(t)$\in \mathcal{J}_1$, respectively.

Next, consider $\mathcal{J}_2\{J \in N | |J|=2\}$. For each j in $\mathcal{J}_2$, any t in $\{t \in T | J=head(t)\}$ is such that |tail1(t)|=1 and |tail2(t)|=1. Therefore, upper bounds $M_{t,1}$ and $M_{t,2}$ have been identified for $\lambda_{t,1}^{\hat{v}}$ and $\lambda_{t,2}^{\hat{v}}$ respectively, in the first iteration. Hence Equation (6) can be written as $$\Sigma_{t:J=tail1(t)}\lambda_{t,1}^{\hat{v}} + \Sigma_{t:J=tail2(t)}\lambda_{t,2}^{\hat{v}} \leq \beta_J + \eta + \Sigma_{t:J=head(t)}(M_{t,1} + M_{t,2})$$

Equation (7)

Thus $M_{t,1}$ for tail1(t)$\in \mathcal{J}_2$ and $M_{t,2}$ for tail2(t)$\in \mathcal{J}_2$ can be obtained from the right hand side of Equation (7).

The above can be repeated for $\mathcal{J}_k\{J \in N | |J|=k\}$, $3 \leq k \leq n$, by considering sets of increasing cardinality to determine all the bounds $M_{t,j}$ for j=1,2.

Let V denote the set of vectors v in $\mathbb{B}^{|T|}$ composing a feasible solution to Equation (2), and let $V_k = \{v|v \in V, \|v\|_1 \leq k\}$, i.e., the elements of $V_K$ represent the proper triple sets containing at most k elements.

The size-constrained best-bound relaxation can be formulated as the following bilevel formulation to identify an element of $V_k$ that yields the best LP relaxation bound.

$$\max_{v \in V_k} \min_{y \in [0,1]^{|N|}} \Sigma_{i=1}^m \alpha_i y_{J_i}$$

Equation (8a)

$$\text{s.t. } By_t \leq b + cv_t \forall \, t = (J, J', J'') \in T$$

Equation (8b)

Note that y and v variables are defined over T and N, respectively, as in Equation (3). Further, $y_t$ denotes the collection of variables $(y_J, y_{J'}, y_{J''})$, where t=(J,J',J''). Using strong duality, the max-min problem in Equation (8) can be equivalently cast as the following MIP:

$$\max_{v \in V_k, \lambda, \mu} -\Sigma_{t \in T} \lambda_{t,3} - \Sigma_{J \in N} \mu_J$$

Equation (9a)

s.t. Equation (5b)–(5c)   Equation (9b)

$$\lambda_{t,j} \leq M_{t,j} v_t \quad t \in T, j = 1, 2, 3$$

Equation (9c)

In this way, the optimal factorable reduction module 202b represents the monomial $f_i(x)$ as the decision diagram $\mathcal{D}_i$ (e.g. the decision diagram 322) that encodes every possible factorizations of the monomial $f_i(x)$ (e.g. $f_i(x)=x_1 x_2 x_3 x_4$). Similarly, the optimal factorable reduction module 202b may represent each multilinear monomial in the polynomial function as the decision diagram to produce a set of decision diagrams. For instance, the set of decision diagrams produced by the optimal factorable reduction module 202b may be as illustrated in FIG. 3G.

Figure 3G:
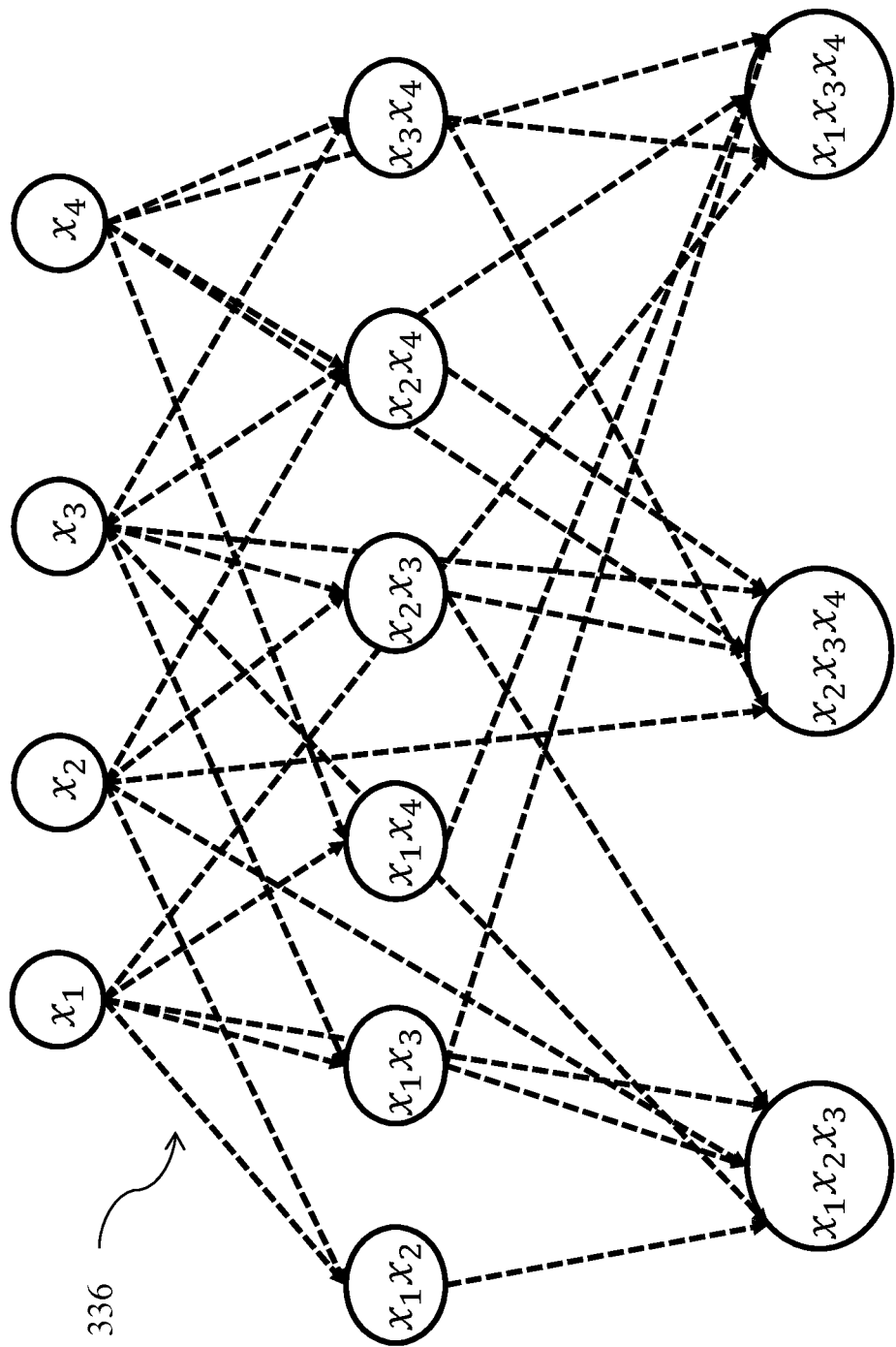
FIG. 3G illustrates a schematic diagram showing a unified decision diagram, according to some embodiments of the present disclosure.

FIG. 3G illustrates a schematic diagram showing a set of decision diagrams, according to some embodiments of the present disclosure. The decision diagrams for the three monomials have been combined into a single unified decision diagram. The unified decision diagram represents the set of all possible factorizations of the polynomial. For purpose of explanation, considering the polynomial function $f(x)=\Sigma_{i=1}^3 \alpha_i f_i(x)=x_1 x_2 x_3 - x_2 x_3 x_4 - x_1 x_3 x_4$. According to an embodiment, the optimal factorable reduction module 202b may represent each monomial of the polynomial function $f(x)$ as the decision diagram $\mathcal{D}_i$ to produce the set of decision diagrams. For instance, the optimal factorable reduction module 202b may represent the monomial $f_1(x) = x_1 x_2 x_3$, $f_2(x) = x_2 x_3 x_4$ and $f_3(x) = x_1 x_3 x_4$ as the decision diagram 336, as explained in the detailed description of FIG. 3A-FIG. 3F. To this end, the optimal factorable reduction module 202b may produce an unified decision diagram 326, where the decision diagram 326 encodes every possible factorization of the monomials $f_1(x) = x_1 x_2 x_3 x_4$, $f_2(x) = x_2 x_3 x_4$ and $f_3(x) = x_1 x_3 x_4$.

Once the set of decision diagram are produced, the optimal factorable reduction module 202b may be configured to select the minimum number of additional variables using the set of decision diagram. According to an example embodiment, to select the minimum number of additional variables, the optimal factorable reduction module 202b may be configured to solve a consistent path problem in the set of decision diagrams connected by a consistency of the intermediate monomials. As used herein, the intermediate monomials may be the monomials that are represented by the parent nodes of the decision diagrams in the set of decision diagrams. As used herein, the consistency of the intermediate monomials may indicate that if the intermediate monomials having similar structure is present in one or more decision diagrams of the set of decision diagrams, then the intermediate monomials having similar structure may be selected for the factorization of the polynomial function and may be represented with same additional variable. As used herein, the consistent path problem may be defined as a problem to find the intermediate monomials in the set of decision diagram subjected to the consistency of the intermediate monomials such that the intermediate monomials factorize the polynomial function.

According to an embodiment, the mixed-integer optimization problem solves the consistent path problem by minimizing over the nodes and the arcs connecting the nodes in the set of decision diagrams subjected to the consistency of the intermediate. For instance, the mixed-integer optimization problem may be mathematically defined as below.

$$\min \Sigma_{t \in T} v_t$$

Equation (10a)

$$\text{s.t. } \Sigma_{t \in T_i: head(t)=J_i} u_{i,t} = 1 \forall i \in [m] \text{ with } |J_i| > 1,$$

Equation (10b)

$$\Sigma_{t \in T_i: head(t)=J} u_{i,t} = \Sigma_{t \in T_i: J \in tails(t)} u_{i,t} \forall i \in [m], \forall J \in N_i:$$
$$2 \leq |J| < |J_i|,$$

Equation (10c)

$$u_{i,t} \leq v_t \forall t \in T_i, i \in [m],$$

Equation (10d)

$$u_i \in \mathbb{B}^{|T_i|} \forall i \in [m],$$

Equation (10e)

$$v \in \mathbb{B}^{|T|}$$

Equation (10f)

The variables of our model are $u_t \in \mathbb{B}^{|T|}$ and $v \in \mathbb{B}^{|T|}$, where:

- $u_{i,t}$ indicates whether triple t is used in the exact linearization of monomial i; and
- $v_t$ indicates whether the triple t can be used in the exact linearization of any monomial $i \in [m]$.

These variables are used to represent the selection of the triples composing a proper triple set T. Variables $u_{i,t}$ are used to select a linearization of monomial i, and variables $v_t$ indicate that a triple belongs to T' and can be used in the linerization of one or more monomials in [m].

Figure 3H:
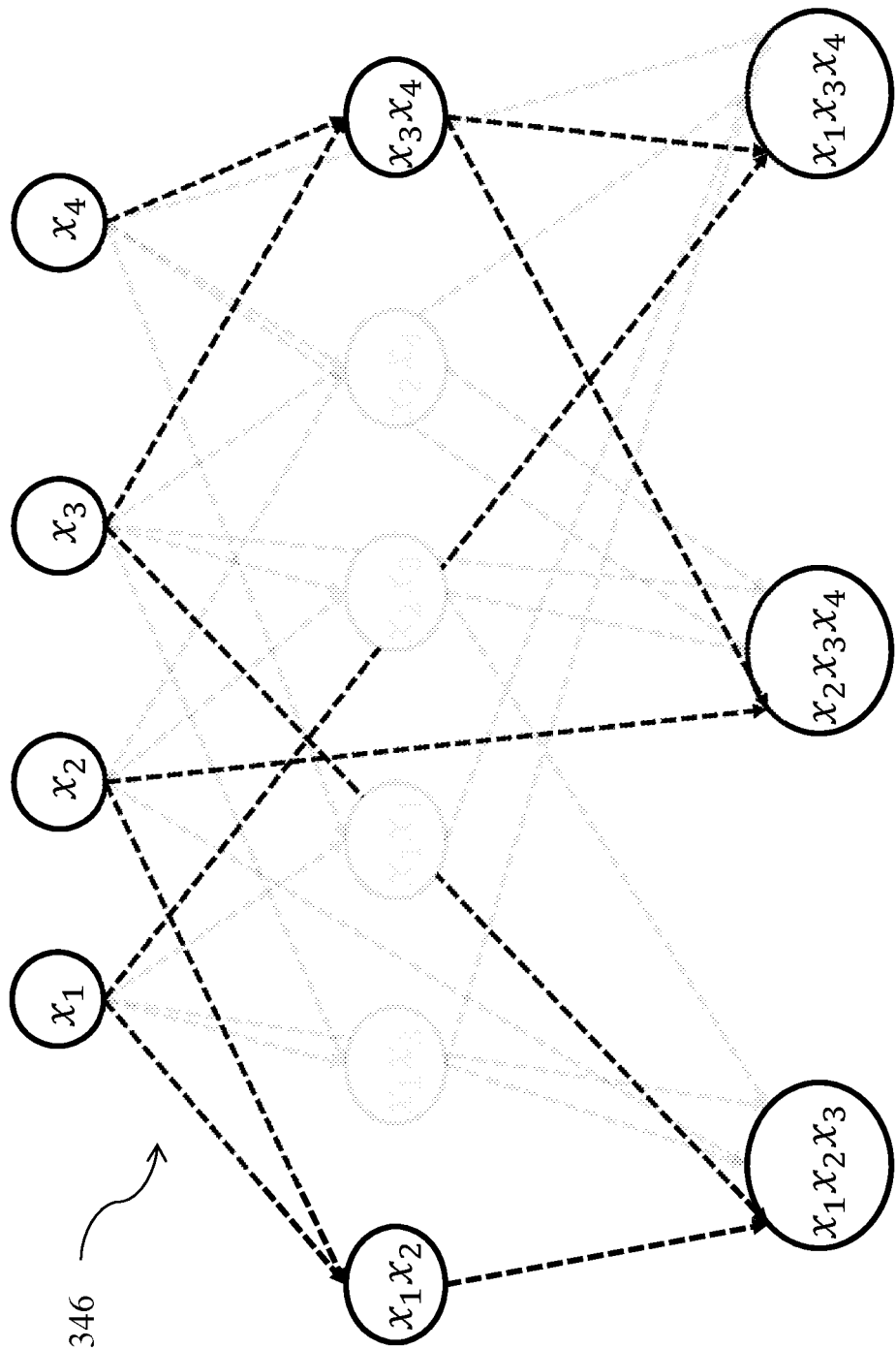
FIG. 3H illustrates a schematic diagram showing a minimum factorization for a polynomial function, according to some embodiments of the present disclosure.

For instance, the minimum factorization for the polynomial function $f(x)=x_1x_2x_3-x_2x_3x_4-x_1x_3x_4$ is as illustrated in FIG. 3H.

FIG. 3H illustrates a schematic diagram showing the minimum factorization for the polynomial function, according to some embodiments of the present disclosure. FIG. 3H is explained in conjunction with FIG. 3G. In an example embodiment, the optimal factorable reduction module 202b may be configured to select one or more intermediate monomials that are common in the decision diagram 346. For instance, the optimal factorable reduction module 202b may select the intermediate monomial $x_3x_4$, since the intermediate monomial $x_3x_4$ is present in both the monomials $x_2x_3x_4$ and $x_1x_3x_4$. Further, the optimal factorable reduction module 202b may identify one or more encodings of the factorizations of each of the monomials in the polynomial function such that the one or more encodings is associated with the selected one or more intermediate monomials. For instance, the optimal factorable reduction module 202b may identify the one or more encodings of the factorizations for each monomial. Let $v^{min}$ denote the optimal solution in Equation (2) corresponding to the minimum factorable reduction shown in the diagram 346. The relaxation bound that is obtained by solving Equation (3) using $v^{min}$ is −4/3. This is the lower bound on the globally optimal solution of the polynomial function $f(x)=x_1x_2x_3-x_2x_3x_4-x_1x_3x_4$. In this factorization, the number of additional variables introduced is 9. On the other hand, if all the arcs are chosen then the best relaxation bound that can be obtained is −1. Thus, the relaxation bound obtained using the minimum factorable reduction shown in 346 is weaker than the best that can be obtained by choosing all the arcs.

Figure 3I:
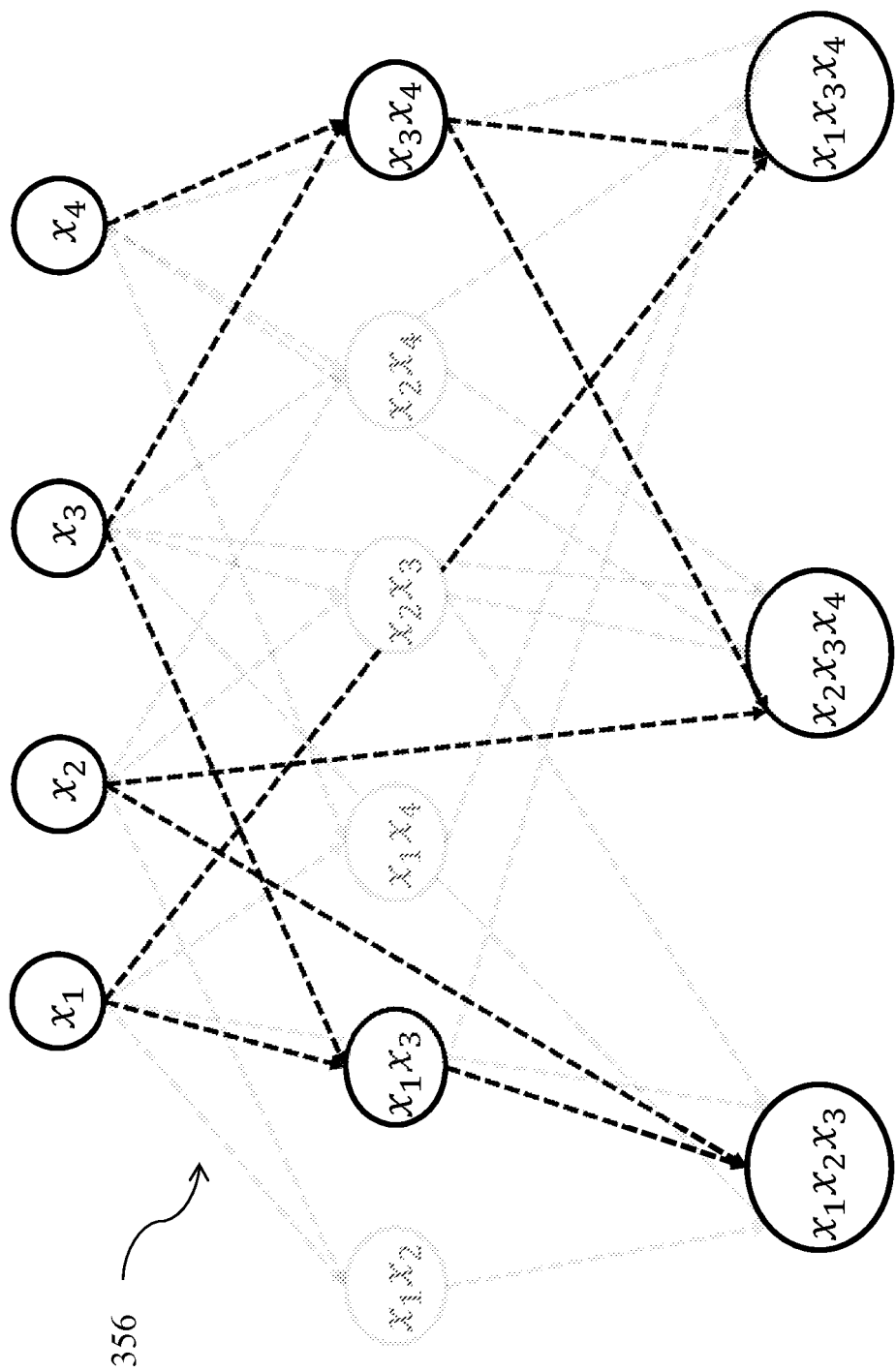
FIG. 3I illustrates a schematic diagram showing a size-constrained best-bound factorization for a polynomial function, according to some embodiments of the present disclosure.

FIG. 3I illustrates another factorization of the polynomial function $f(x)=x_1x_2x_3-x_2x_3x_4-x_1x_3x_4$. The decision diagram in 356 shows another minimum factorable reduction of the polynomial. For instance, the optimal factorable reduction module 202b may select to introduce the intermediate monomial $x_2x_3$ in order to factorize the monomial $x_1x_2x_3$ in diagram 356. Observe that the reduction for the remaining monomials $x_2x_3x_4$ and $x_1x_3x_4$ used in diagram 356 is identical to that used in diagram 346. Let $v^{bb}$ denote the optimal solution in Equation (2) corresponding to the minimum factorable reduction shown in the diagram 356. The relaxation bound that is obtained by solving Equation (3) using $v^{min}$ is −1. This is the lower bound on the globally optimal solution of the polynomial function $f(x)=x_1x_2x_3-x_2x_3x_4-x_1x_3x_4$. In this factorization, the number of additional variables introduced is 9. Thus, the relaxation bound obtained using the minimum factorable reduction shown in 356 is equal to the best that can be obtained by choosing all the arcs. The factorization in diagram 356 is the size-constrained best bound factorization for a factorization that uses 9 or more additional variables. In this example, the size-constrained best bound factorization also uses the minimum number of additional variables.

Some embodiments are based on the realization that the optimal reduction module 202b may derive multiple bilinear programing reformulations for the polynomial optimization with same number of minimum additional variables. To this end, the optimal reduction module 202b may identify that bilinear programming reformulation which leads to the LP relaxation with a largest lower bound.

For purpose of explanation, in FIG. 3A to FIG. 3I, the optimal factorable reduction module 202b may set the target degree for the polynomial function as a value of 'two'. For instance, when the target degree for the polynomial function is set to the value of 'two', the optimal factorable reduction module 202b may be configured as explained in the detailed description of FIG. 4.

Figure 4:
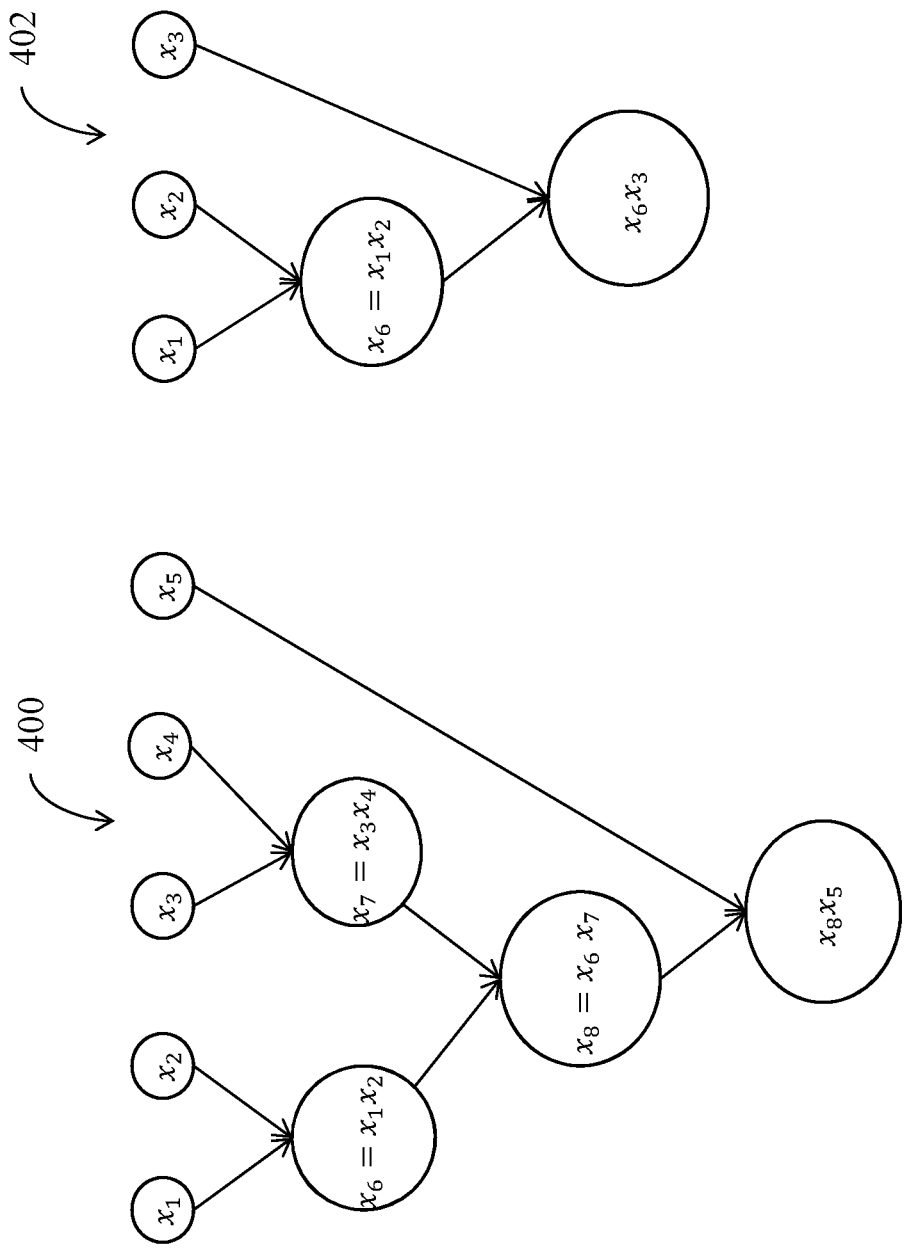
FIG. 4 illustrates a schematic diagram showing the minimum factorization for the polynomial function, according to some other example embodiments of the present disclosure.

FIG. 4 illustrates a schematic diagram showing a minimum factorization for the polynomial function $f(x)$, according to some other example embodiments of the present disclosure. For instance, when the target degree for reducing the polynomial function $f(x)$ is set to the value of 'two', the optimal factorable reduction module 202b may derive the bilinear programming relaxation for the polynomial function $f(x)$. For purpose of explanation, considering the polynomial function $f(x)=20\,x_1x_2x_3x_4x_5+55\,x_1x_2x_3$. In an example embodiment, to derive the bilinear programming relaxation for the polynomial function $f(x)=20\,x_1x_2x_3x_4x_5+55\,x_1x_2x_3$, the optimal factorable reduction module 202b may be configured to represent a monomial $f_1(x)=x_1x_2x_3x_4x_5$ with a first decision diagram such that the first decision diagram encodes every possible factorization of the monomial $f_1(x)=x_1x_2x_3x_4x_5$. For instance, the optimal factorable reduction module 202b may represent the monomial $f_1(x)=x_1x_2x_3x_4x_5$ with the first decision diagram as explained in the detailed description of FIG. 3A to FIG. 3D.

Similarly, the optimal factorable reduction module 202b may be configured to represent a monomial $f_2(x)=x_1x_2x_3$ with a second decision diagram such that the second decision diagram encodes every possible factorization of the monomial $f_2(x)=x_1x_2x_3$. Further, the optimal factorable reduction module 202b may be configured to produce a set of decision diagrams that includes the first decision diagram and the second decision diagram. Furthermore, the optimal factorable reduction module 202b may be configured to solve the mixed-integer optimization problem in the set of decision diagrams connected by the consistency of the intermediate monomials, as explained in the detailed description of FIG. 3G and FIG. 3H. In response to solving the mixed-integer optimization problem, the optimal factorable reduction module 202b may be configured to find a subgraph 400 in the first decision diagram and a subgraph 402 in the second decision diagram as the optimal solution. For instance, the optimal factorable reduction module 202b may find the subgraphs 400 and 402 as the optimal solution.

In an example embodiment, the optimal factorable reduction module 202b may introduce a new additional variable $x_6$ to represent intermediate monomial $x_1x_2$ in the sub graphs 400 and 402. Further, the optimal factorable reduction module 202b may introduce a new additional variable $x_7$ in the sub graph 400 to represent intermediate monomial $x_3x_4$. Furthermore, the optimal factorable reduction module 202b may introduce a new additional variable $x_8$ in the sub graph 400 to represent the bilinear product of the intermediate monomial $x_1x_2$ (represented by the additional variable $x_6$) and the intermediate monomial $x_3x_4$ (represented by the additional variable $x_7$).

To this end, the polynomial optimization of the polynomial function $f(x)=20\, x_1x_2x_3x_4x_5+55\, x_1x_2x_3$ may be represented as below.

$$\min 20x_8x_5+55x_6x_3 \quad \text{Equation (11a)}$$

$$\text{s.t. } x_6=x_1x_2, x_7=x_3x_4, x_8=x_6x_7,\; l_i\leq x_i\leq u_i \quad \text{Equation (11b)}$$

The Equation (11a) and (11b) may be the bilinear programing reformulation of the polynomial function $f(x)$, since the degree of the monomials in Equation (11a) and the degree of the product terms in the Equations (11b) is equal to the value of 'two'. Further, in some example embodiment, the optimal factorable reduction module 202b may reduce the bilinear programming reformulation to the LP relaxation using the McCormick convex and concave envelops.

For purpose of explanation, in FIG. 4, the optimal factorable reduction module 202b setting the target degree for the polynomial function as the value of 'two' is considered. In some yet other embodiments, the optimal factorable reduction module 202b may set the target degree for the polynomial function as the value of 'less than or equal to three'. For instance, when the target degree for the polynomial function is set to the value of 'less than or equal to three', the optimal factorable reduction module 202b may be configured as explained in the detailed description of FIG. 5.

Figure 5:
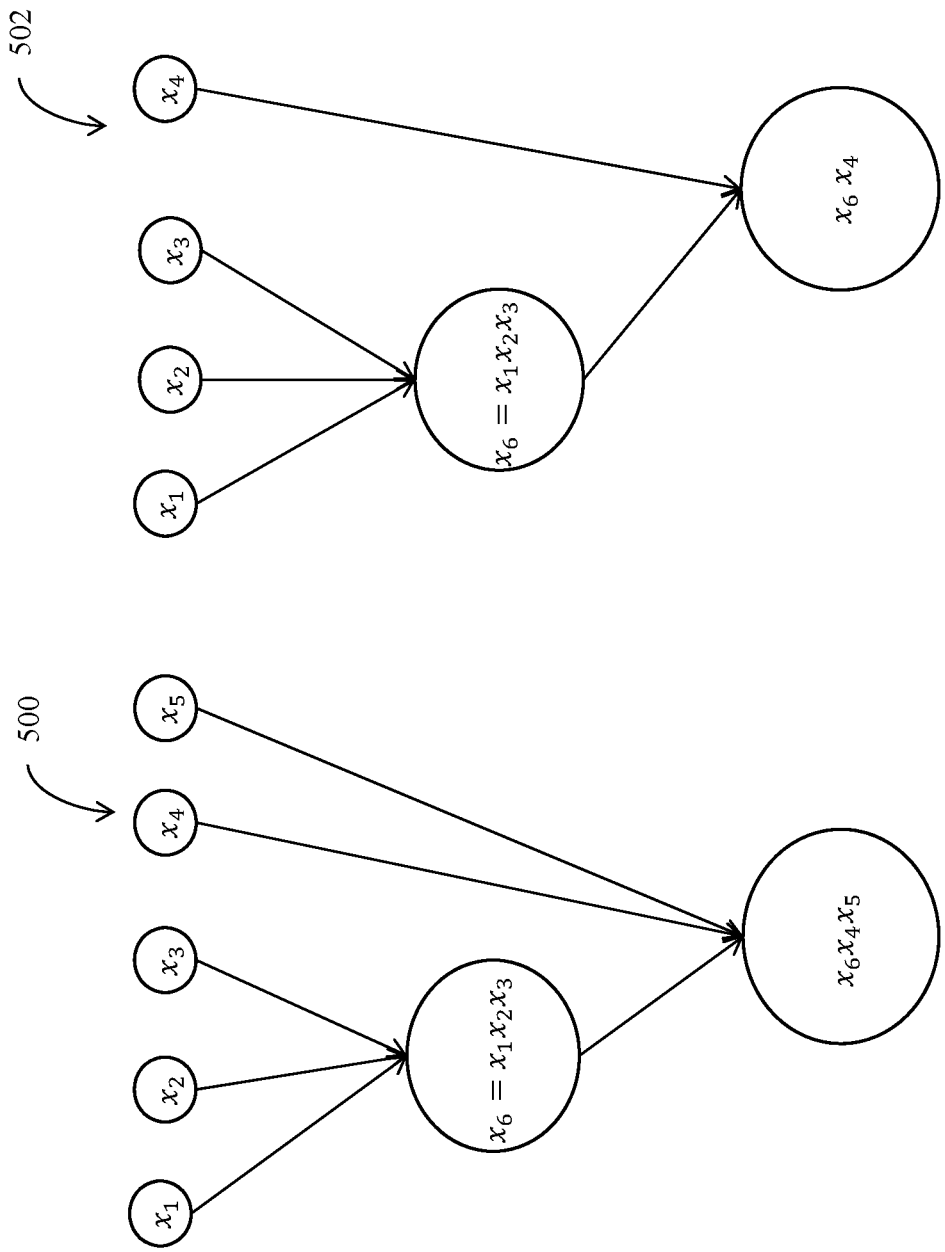
FIG. 5 illustrates a schematic diagram showing a minimum factorization for the polynomial function, according to yet some other example embodiments of the present disclosure.

FIG. 5 illustrates a schematic diagram showing a minimum factorization for the polynomial function $f(x)$, according to yet some other example embodiments of the present disclosure. For instance, when the target degree for reducing the polynomial function $f(x)$ is set to the value of 'less than or equal to three', the optimal factorable reduction module 202b may derive the trilinear programming reformulation for the polynomial function $f(x)$. For purpose of explanation, considering the polynomial function $f(c)=x_1x_2x_3x_4x_5+x_1x_2x_3\, x_4$. In an example embodiment, to derive the trilinear programming reformulation for the polynomial function $f(x)=x_1x_2x_3x_4x_5+x_1x_2x_3\, x_4$, the optimal factorable reduction module 202b may be configured to represent a monomial $f_1(x)=x_1x_2x_3x_4x_5$ with a first decision diagram such that the first decision diagram encodes every possible factorization of the monomial $f_1(x)=x_1x_2x_3x_4x_5$. For instance, the optimal factorable reduction module 202b may represent the monomial $f_1(x)=x_1x_2x_3x_4x_5$ with the first decision diagram as explained in the detailed description of FIG. 3A to FIG. 3D.

Similarly, the optimal factorable reduction module 202b may be configured to represent a monomial $f_2(x)=x_1x_2x_3x_4$ with a second decision diagram such that the second decision diagram encodes every possible factorization of the monomial $f_2(x)=x_1x_2x_3x_4$. Further, the optimal factorable reduction module 202b may be configured to produce a set of decision diagrams that includes the first decision diagram and the second decision diagram. Furthermore, the optimal factorable reduction module 202b may be configured to solve the mixed-integer optimization problem in the set of decision diagrams connected by the consistency of the intermediate monomials, as explained in the detailed description of FIG. 3G and FIG. 3H. In response to solving the mixed-integer optimization problem, the optimal factorable reduction module 202b may be configured to find a subgraph 500 in the first decision diagram and a subgraph 502 in the second decision diagram as the optimal solution. For instance, the optimal factorable reduction module 202b may find the subgraphs 500 and 502 as the optimal solution as explained in the detailed description of FIG. 3H. Furthermore, the optimal factorable reduction module 202b may be configured to determine the additional variables for the optimal solution.

In an example embodiment, the optimal factorable reduction module 202b may introduce a new additional variable $x_6$ to represent intermediate monomial $x_1x_2x_3$ in the sub graphs 500 and 502. To this end, the polynomial optimization of the polynomial function $f(x)=x_1x_2x_3x_4x_5+x_1x_2x_3x_4$ may be represented as below.

$$\min x_6x_4x_5+x_6x_4 \quad \text{Equation (12a)}$$

$$\text{s.t. } x_6=x_1x_2x_3\; l_i\leq x_i\leq u_i \quad \text{Equation (12b)}$$

The Equation (12a) and (12b) may be the trilinear programing reformulation of the polynomial function $f(x)$, since the degree of the monomials in the Equation (12a) and the degree of the product terms in the Equations (12a) is equal to the value of 'less than or equal to three'. Further, in some example embodiment, the optimal factorable reduction module 202b may reduce the trilinear programming reformulation to the LP relaxation using one or more of the McCormick convex and concave envelops and/or polyhedral envelops. For instance, the polyhedral envelops may be used to represent a trilinear product as a linear function by using a set of inequalities.

In another example embodiment, a SemiDefinite Programming (SDP) relaxation may be used to compute a lower bound for the bilinear programming reformulation in Equations (11a) and (11b). The SDP relaxation is obtained by approximating the outer product of the vector variables. Let $x=(x_0,\ldots,x_8)$ denote the column vector of the variables in Equations (11a)-(11b) i.e. the set of original variables and additional variable introduced to reduce the degree of the polynomial to the target degree of less than or equal to 2. Then, the outer $xx^T$ is 9×9 matrix consisting of all the possible pairwise product terms that can be formed using the variables, i.e.

$$xx^T = \begin{pmatrix} x_0^2 & \cdots & x_0x_8 \\ \vdots & \ddots & \vdots \\ x_0x_8 & \cdots & x_8^2 \end{pmatrix} \quad \text{Equation (13)}$$

The SDP relaxation is a linear program over the semidefinite cone and is written as $$\min 10x_7+5x_8 \quad \text{Equation (14a)}$$

s.t. $x_7=X_{56}, x_8=X_{05}, x_5=X_{23}, x_6=X_{14},\; l_i\leq x_i\leq u_i, X-xx^T$ is positive semidefinite, $X_{ii}\leq \min(l_i^2, u_i^2)$     Equation (14b)

where $X_{ij}$ refers to the entry of the matrix X in row i and column j. The matrix X is a symmetric matrix that approximates the outer product $xx^T$.

Figure 6A:
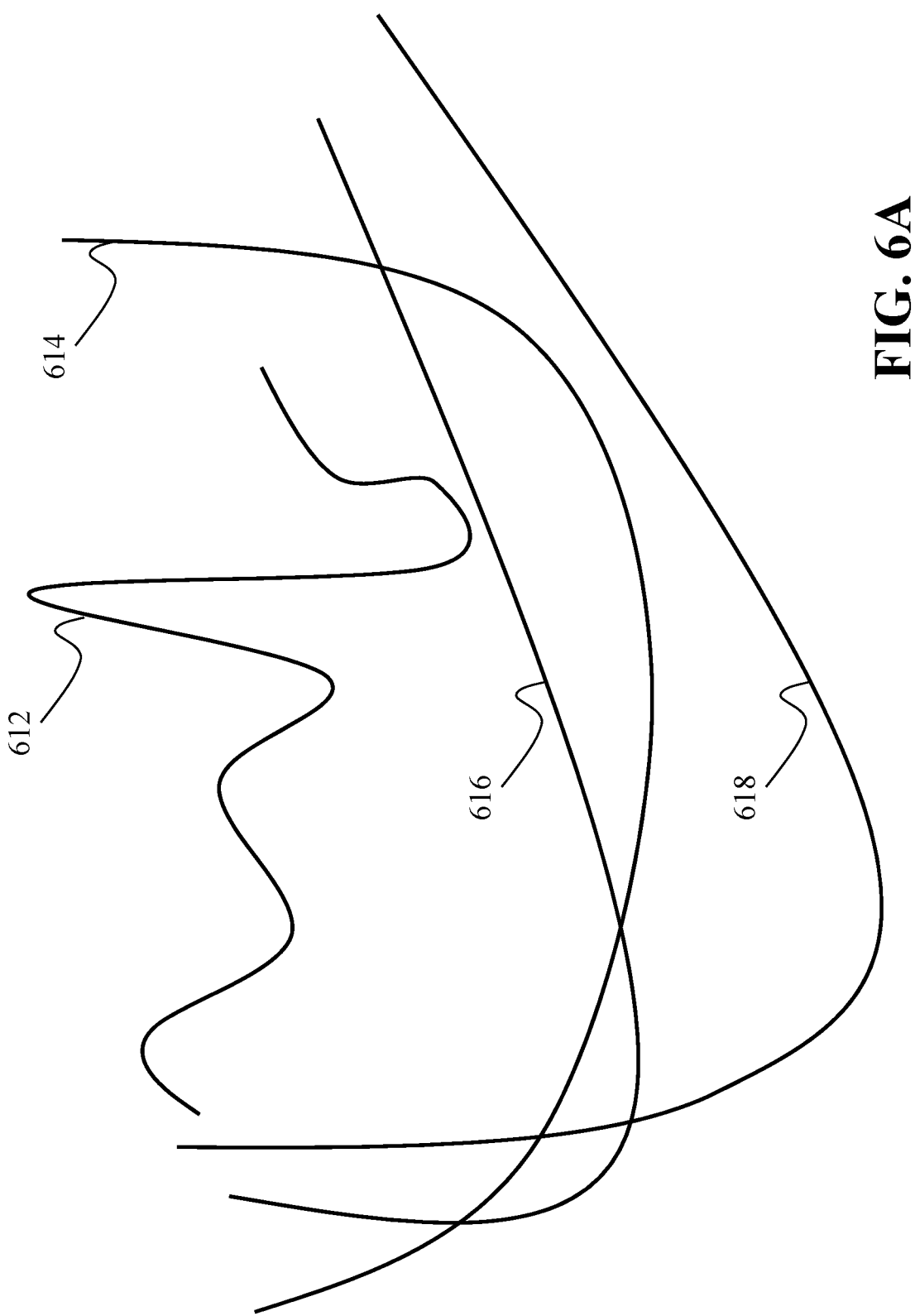
FIG. 6A shows a schematic illustrating different relaxation for an exemplary function used by some embodiments.

FIG. 6A shows a schematic illustrating different relaxation for an exemplary function 612 used by some embodiments. As can be seen in FIG. 6A, function 612 is non-convex and difficult to optimize. To reduce the optimization complexity, function 612 can be approximated with a convex function, such as functions 614, 616, and 618. All these approximating functions are convex with global optimum and hence easier to solve. However, the solution of these functions does not provide the solution of the original function 612 but provides a relaxation bound of the solution. For example, if the objective is to minimize function 612, the solutions of functions 614, 616, and 618 provide a lower bound on the solution of the minimization of function 612. As can be seen in FIG. 6A, different functions provide different relaxation bounds. For example, the relaxation bound of function 614 is higher than the relaxation bound of function 618. If the objective of the optimization of function 612 is to find a global minimum, relaxation 616 is better or more optimal than relaxation 618.

Some embodiments are based on the realization that different encodings of the factorization of the polynomial function can have different relaxation bounds. Hence, while the number of additional variables is one criterion for optimization of the factorization, the relaxation bounds of the factorization is another criterion of optimization.

Figure 6B:
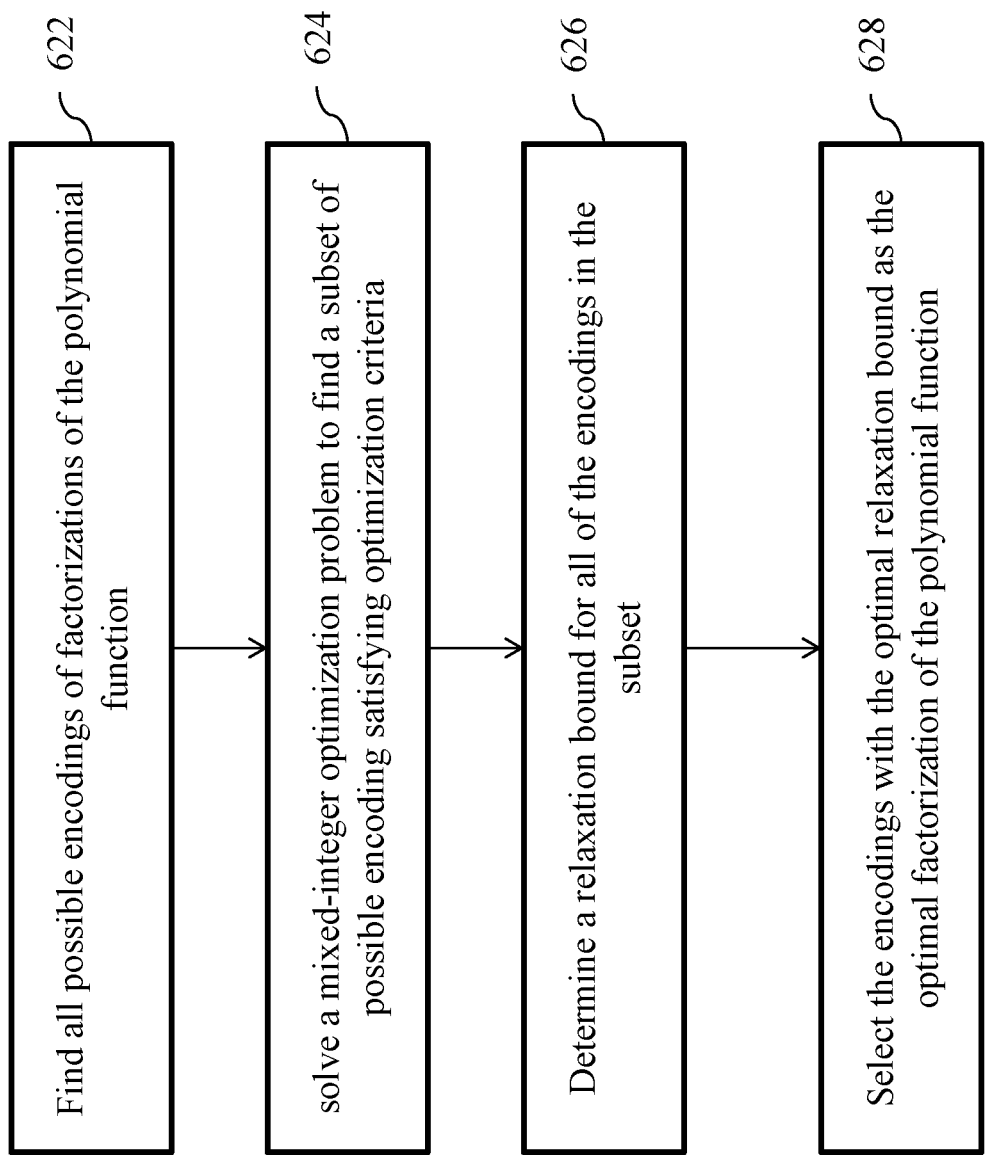
FIG. 6B shows a block diagram of a method for selecting an optimal factorization of a polynomial function according to some embodiments.

FIG. 6B shows a block diagram of a method for selecting an optimal factorization of a polynomial function according to some embodiments. The method finds 622 all possible encodings of factorizations of the polynomial function. An example of such all possible encodings is shown in FIG. 3D. Next, the method solves 624 a mixed-integer optimization problem to find a subset of possible encoding satisfying optimization criteria. Different embodiments can use different optimization criteria. For example, one embodiment places in the subset all encodings determined by introducing less than a predetermined number of additional variables. Additionally or alternatively, another embodiment selects a limited number of the encodings in the subset. An example of such a subset of all possible encodings is shown in FIG. 3I.

Next, the method determines 626 a relaxation bound for all of the encodings in the subset and selects 628 the encodings with the optimal relaxation bound as the optimal factorization of the polynomial function. As used herein, the optimality of factorization depends on the objective of the optimization of the polynomial function. If the objective is to minimize the polynomial function, the optimal relaxation bound is the highest. If the objective is to maximize the polynomial function, the optimal relaxation bound is the lowest.

Figure 6C:
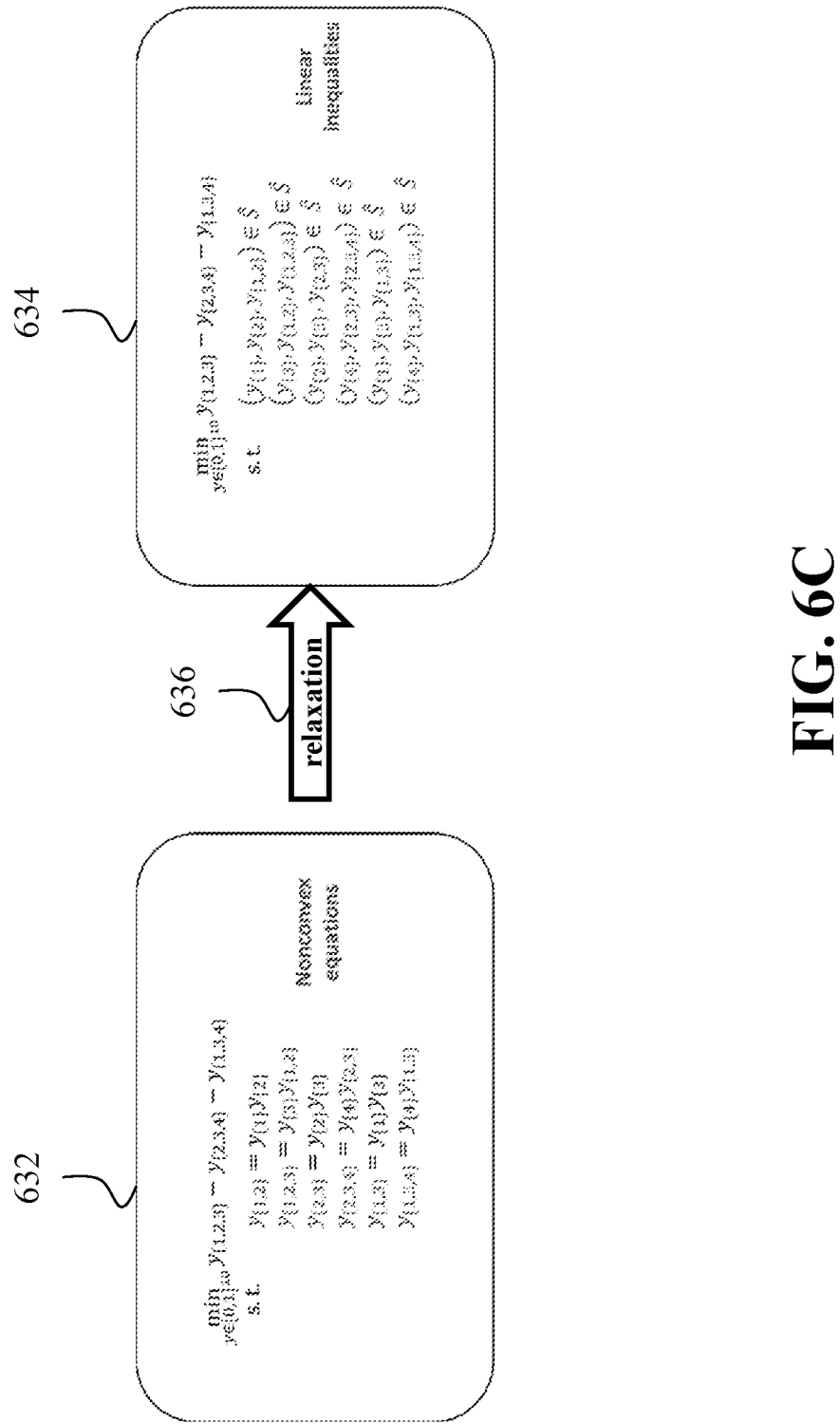
FIG. 6C shows a schematic illustrating principle of relaxation used by some embodiments.

FIG. 6C shows a schematic illustrating principle of relaxation used by some embodiments. A factorization of a polynomial function 632 is represented using nonconvex equations caused by equalities of the introduction of additional variables. The embodiments relax 636 these nonconvex questions by replacing equalities with linear inequalities 634. The solution of system 634 provides the relaxation bound of the factorization 632.

As an example of RML-based Polyhedral Relaxation of Consider the bilinear function $\varphi(x_i, x_j) = x_i x_j$ defined over the box $\mathcal{H} = [0,1]^2$. Convex envelope of $\varphi$: Tightest convex under-estimator of $\varphi$ over $\mathcal{H}$.

$$\operatorname*{conv}_{\mathcal{H}} \varphi(x_i, x_j) = \max\{0, x_i + x_j - 1\}.$$

Concave envelope of $\varphi$: Tightest concave over-estimator of $\varphi$ over $\mathcal{H}$.

$$\operatorname*{conc}_{\mathcal{H}} \varphi(x_i, x_j) = \min\{x_i, x_j\}$$

Consider the following nonconvex set:

$$S(x_i, x_j, x_k) = \{(x_i, x_j, x_k) \in [0,1]^2 \times \mathcal{H} : x_k = x_i x_j\}$$

The convex hull of S is given by $$\hat{S}(x_i, x_j, x_k) = \{(x_i, x_j, x_k) \in [0,1]^2 \times \mathbb{R} : \max\{0, x_i + x_j - 1\} \le x_k \le \min\{x_i, x_j\}\}$$

or $$\hat{S} = \left\{(x_i, x_j, x_k) \in [0,1]^2 \times [0, \infty) : \begin{array}{l} x_k \le x_i \\ x_k \le x_j \\ x_i + x_j - x_k \le 1 \end{array}\right\}.$$

Figure 6D:
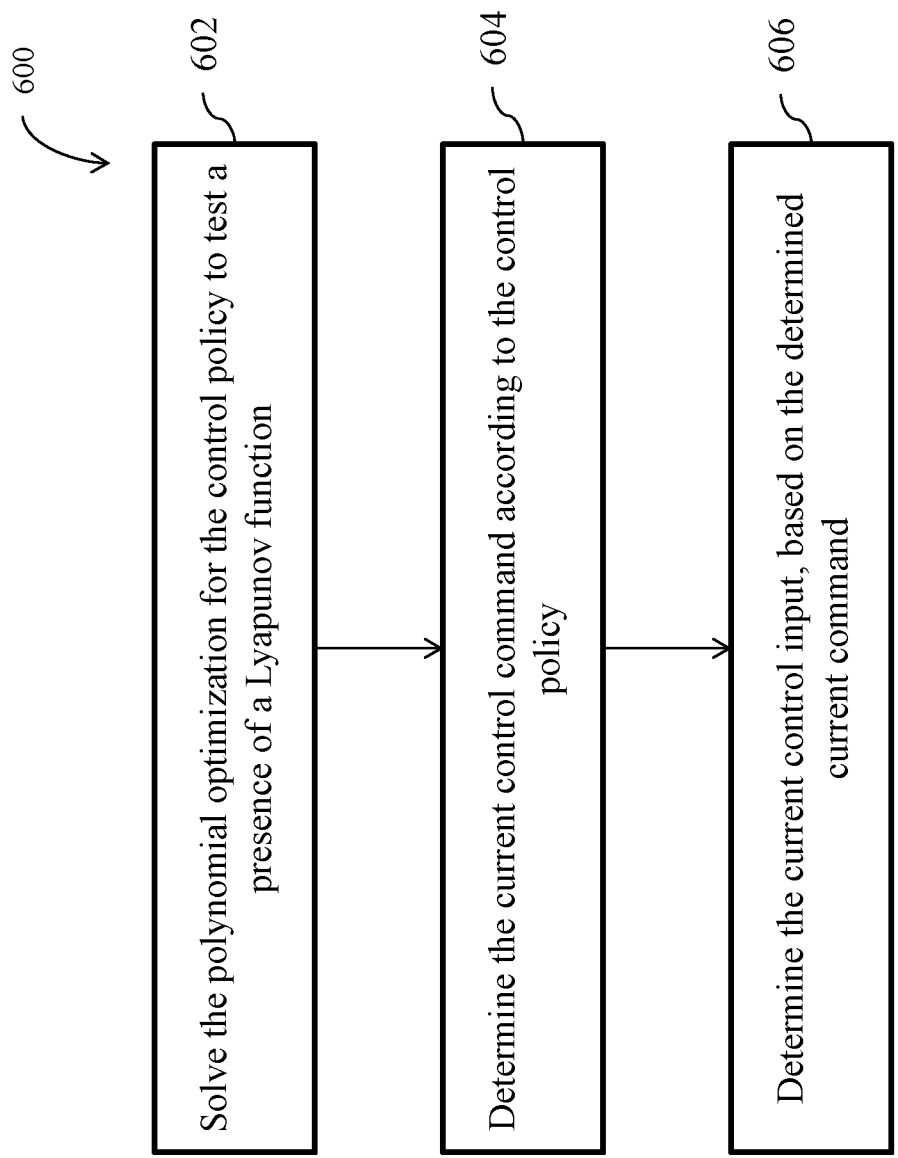
FIG. 6D illustrates a method 600 for determining the current control input, according to some example embodiments of the present disclosure.

FIG. 6D illustrates a method 600 for determining the current control input, according to some example embodiments of the present disclosure. The method 600 may be used in conjunction with the controller 100 described in the detailed description of FIG. 2. For instance, the at least one processor 202 may be configured to execute blocks of the method 600.

Starting at block 602, the controller 100 may be configured to solve the polynomial optimization for the control policy to test a presence of a Lyapunov function. For instance, the controller 100 may compute the minimization for the control policy with the reformulation obtained from the optimal factorable reduction module 202b to test the presence of the Lyapunov function. For example, the Lyapunov function may be a set of equations that define a stability of the system 102 using the feedback signal that includes the current measurement of the current state of the system 102 and/or the previous measurements of the previous states of the system 102.

At block 604, the controller 100 may determine the current control command according to the control policy. As used herein, the current control command may define a desired behavior of the system 102. For instance, if the solution to the polynomial optimization of the control policy indicates that the system 102 is not directed towards the stability, then the controller 100 may determine the current control command to direct the system 102 towards the stability.

At block 606, the controller 100 may determine the current control input, based on the determined current command. Such current control input may be used further to control the system 102.

Figure 7:
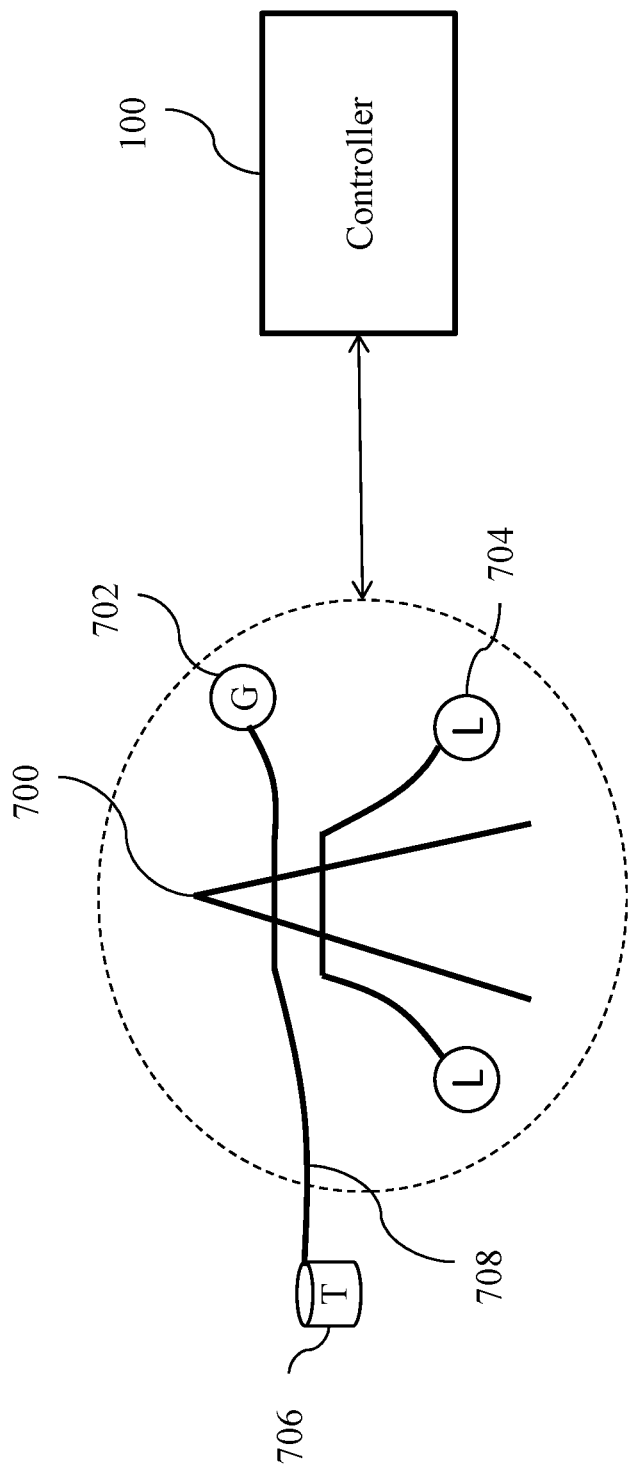
FIG. 7 illustrates a schematic diagram showing the controller connected to an electrical grid, according to some embodiments of the present disclosure.

FIG. 7 illustrates a schematic diagram showing the controller 100 connected to an electrical grid 700, according to some embodiments of the present disclosure. The electrical grid 700 may deliver an electric power from an electrical power generator 702 to one or more loads 704 and/or to a transformer 706 via transmission lines 708. The transformer 706 may be connected to another electrical grid and/or one or more other loads. Some embodiments are based on the realization that if there is a rapid load increase in a transmission network, a difference in peak load power and a valley load power may also increase, leading to voltage violation problems. To this end, transmission line switching technique may be used as a voltage control method. For instance, switching out the transmission lines may control the voltage. Indeed, choices of the transmission lines to be switched out and coordination with other voltage control measures may be represent an optimal transmission switching problem.

Some embodiments are based on the recognition that the optimal transmission switching problem may be formulated as the mixed-integer nonlinear program with the binary variables correspond to on/off state of the transmission lines. To this end, the electrical grid 700 may be operatively coupled to the controller 100. The controller 100 may be configured to determine the sequence of control inputs indicating on/off states of the transmission lines in the power grid 700 by solving the solve the polynomial optimization of the polynomial function that corresponds to the mixed-integer nonlinear program. Thereby, the controller 100 may avoid the voltage violation problems in the transmission network.

Figure 8:
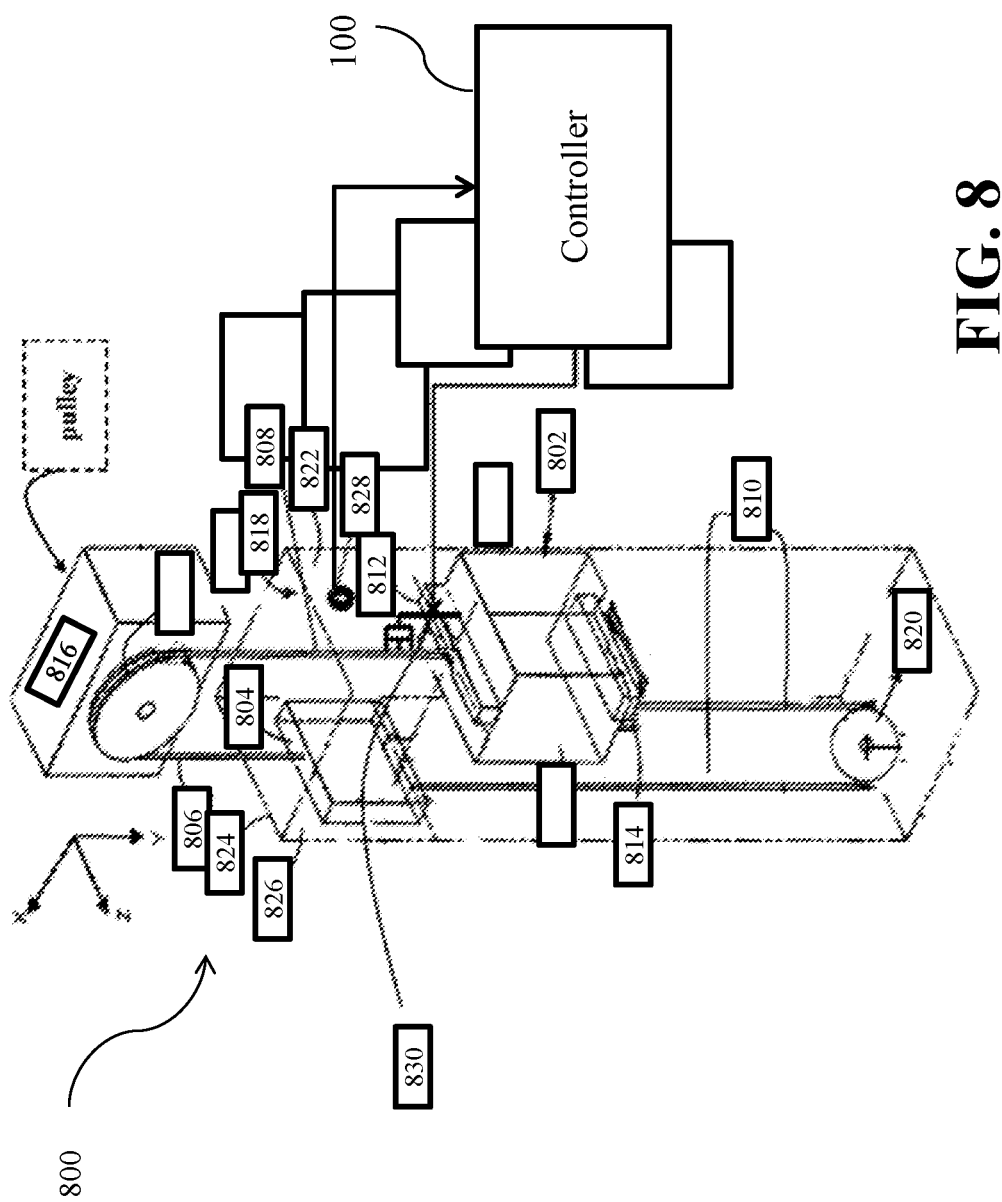
FIG. 8 illustrates a schematic diagram showing the controller connected to an electrical elevator, according to some embodiments of the present disclosure.

FIG. 8 illustrates a schematic diagram showing the controller 100 connected to an electrical elevator 800, according to some embodiments of the present disclosure. The electrical elevator 800 includes an elevator car 802 operably connected to different components of the electrical elevator 800 via at least one elevator rope. For example, the elevator car 802 and a counterweight 804 may be connected to one another by main ropes 806 and 808, and compensating ropes 810. The elevator car 802 may include a crosshead 812 and a safety plank 814. A pulley 816 for moving the elevator car 802 and the counterweight 804 through an elevator shaft 818 can be located in a machine room (not shown) at the top (or bottom) of the elevator shaft 818. The electrical elevator 800 may also include a compensating pulley 820. An elevator shaft 818 includes a front wall 822, a back wall 824, and a pair of side walls 826.

The elevator car 802 and the counterweight 804 have a center of gravity at a point where summations of the moments in the x, y, and z directions are zero. In other words, the elevator car 802 or counterweight 804 may theoretically be supported and balanced at the center of gravity (x, y, z), because all of the moments surrounding the center of gravity point are cancel out. The main ropes 806 and 808 typically are connected to the crosshead 812 of the elevator car 802 where the coordinates of the center of gravity of the elevator car 802 are projected. The main ropes 806 and 808 are connected to the top of the counterweight 804 where the coordinates of the center of gravity of the counterweight 804 are projected.

During the operation of the electrical elevator 800, different components of the elevator are subjected to internal and external disturbance, e.g., sway due to wind, resulting in lateral motion of the components. Such lateral motion of the components can result in a sway of the elevator rope that needs to be measured. Accordingly, one or a set of sway sensors 828 can be arranged in the electrical elevator 800 to determine a lateral sway of the elevator rope.

The set of sensors may include at least one sway sensor 828. For example, the sway sensor 828 is configured to sense a lateral sway of the elevator rope at a sway location associated with a position of the sway sensor.

During the operation of the electrical elevator 800, the locations of the sway are determined and transmitted to the controller 100. The controller 100 determines a state of the sway of the elevator rope, e.g., amplitude and a velocity of the sway. The controller 100 can determine the state of the sway based only on the sway measurements. The controller 100 may determine the control policy that may be a function of the amplitude and the velocity of the sway. Further, the controller 100 may determine the sequence of the control inputs to the electrical elevator 800 by solving the polynomial optimization of the polynomial function (i.e. the determined control policy). The sequence of the control inputs may correspond to damping force. Furthermore, the controller 100 may control a semi-active damper actuator 830 of the electrical elevator 800 to change damping force to the elevator rope, based on the sequence of the control inputs.

Figure 9:
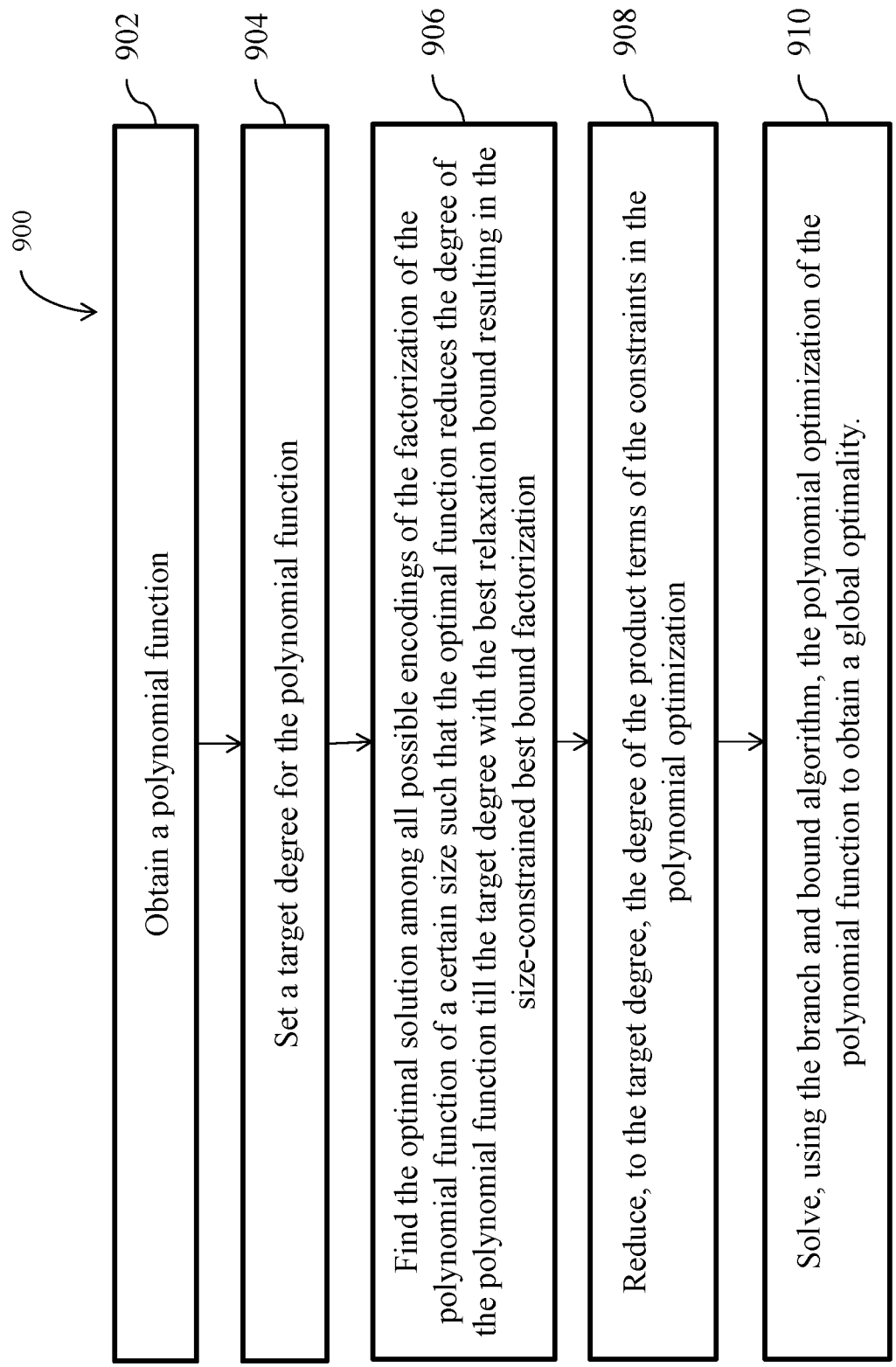
FIG. 9 illustrates a process flow of the controller, according to some embodiments of the present disclosure.

FIG. 9 illustrates a process flow 900 of the controller 100, according to some embodiments of the present disclosure. The process flow 900 may be used in conjunction with the controller 100 described in the detailed description of FIG. 2. Starting at block 902, the controller 100 may obtain the polynomial function. For instance, the polynomial function may be the mixed integer nonlinear program, multilinear program, or the like. At block 904, the controller 100 may set the target degree for the polynomial function to reduce the degree of the polynomial function to the target degree. For instance, the controller 100 may set the target degree as explained in the detailed description of FIG. 3A. At block 906, the controller 100 may find the optimal solution among all possible encodings of the factorization of the polynomial function such that the optimal function reduces the degree of the polynomial function till the target degree with the minimum number of additional variables. For instance, the controller 100 may find the optimal solution as explained in the detailed description of FIG. 3A to FIG. 5.

At block 908, the controller 100 may reduce, to the target degree, the degree of the product terms of the constraints in the polynomial optimization. For instance, the controller 100 may use one or more of the McCormick convex and concave envelops and/or the polyhedral envelops to reduce the degree of the product terms of the constraints. At block 910, the controller 100 may solve, using the branch and bound algorithm, the polynomial optimization of the polynomial function to obtain a global optimality.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the append claims to cover all such variations and modifications as come within the true spirit and scope of the present disclosure.

The invention claimed is:

1. A device for controlling an operation of a system performing a task, comprising:
   a transceiver configured to submit a sequence of control inputs to the system thereby changing states of the system according to the task and to receive a feedback signal including a corresponding sequence of measurements, each measurement is indicative of a state of the system caused by the corresponding control input;
   a feedback controller configured to determine a current control input for controlling the system based on the feedback signal including a current measurement of a current state of the system by solving a polynomial optimization of a polynomial function with a reformulation derived by introducing additional variables reducing a degree of the polynomial function till a target degree subject to constraints on a structure of the additional variables; and
   an optimal factorable reduction module configured to solve a mixed-integer optimization problem to find a subset of encodings among all possible encodings of factorizations of the polynomial function that reduce the degree of the polynomial function to the target degree with a predetermined minimum number of additional variables and selects an optimal encoding from the subset of encodings with an optimal relaxation bound.

2. The device of claim 1, wherein an additional variable in the reformulation is a product of intermediate additional variables ending with a product of at least two of the original variables of the polynomial function.

3. The device of claim 1, wherein an additional variable includes a product of an intermediate additional variable and an original variable of the polynomial function.

4. The device of claim 1, wherein an additional variable is at least one of a bilinear product or a trilinear product.

5. The device of claim 1, wherein the optimal factorable reduction module is configured to factorize, by setting the target degree, the polynomial function to at least one of a bilinear programming reformulation, or a trilinear programming reformulation.

6. The device of claim 1, wherein each of the factorizations of the polynomial function reads on a representation of an in-tree having properties including that a root of the in-tree corresponds to an original monomial of the polynomial function, leaf nodes of the in-tree correspond to the original variables of the original monomial, every node other than the leaf nodes has two child nodes each of which represents a monomial; and a product of the monomials of the child nodes equals a monomial represented by a parent node of the child nodes.

7. The device of claim 1, wherein the optimal factorable reduction module is configured to:
   represent each multilinear monomial in the polynomial function as a decision diagram encoding every possible factorization of the multilinear monomial through collections of paths in the decision diagram to produce a set of decision diagrams of the polynomial function, wherein each path defines different additional variables factorizing the multilinear monomial; and
   select the minimum number of additional variables by solving a consistent path problem in the set of decision diagrams connected by consistency of intermediate monomials such that the intermediate monomials in different decision diagrams having the same structure are represented by same additional variables.

8. The device of claim 7, wherein the mixed-integer optimization problem solves the consistent path problem by minimizing over nodes and arcs connecting the nodes in the set of decision diagrams subject to the consistency of the intermediate monomials.

9. The device of claim 7, wherein the decision diagram encoding every possible linearization of the multilinear monomial is an in-tree having a root including original variables of the multilinear monomial.

10. The device of claim 1, wherein the optimal factorable reduction module is further configured to identify the reformulation that is associated with a largest lower bound.

11. The device of claim 1, wherein the feedback controller solves the polynomial optimization with the relaxation using a branch and bound algorithm, and wherein the relaxation provides a lower bound of the polynomial optimization at every node of a branch and bound algorithm.

12. The device of claim 1, wherein the feedback controller determines the current control command according to a control policy and solves the polynomial optimization to test a presence of a Lyapunov function for the control policy.

13. The device of claim 1, wherein the feedback controller is configured to determine the sequence of control inputs to an electrical grid; and wherein the electrical grid is operatively connected to the device of claim 1.

14. The device of claim 1, wherein the feedback controller is configured to determine the sequence of control inputs to an electrical elevator; and wherein the electrical elevator is operatively connected to the device of claim 1.

15. The device of claim 1, wherein, for each encoding in the subset of encodings, the optimal factorable reduction module is configured to replace equalities caused by an introduction of additional variables with linear inequalities to receive a polyhedral relaxation of the encoding, solve the polyhedral relaxation to determine a solution as a relaxation bound of the encoding, and select the optimal encoding from the subset of encodings by comparing corresponding relaxation bounds based on an objective of the polyhedral relaxation.

16. A method for controlling an operation of a system performing a task, the method comprising:
submitting a sequence of control inputs to the system thereby changing states of the system according to the task;
receiving a feedback signal including a corresponding sequence of measurements, each measurement is indicative of a state of the system caused by the corresponding control input;
determining a current control input for controlling the system based on the feedback signal including a current measurement of a current state of the system by solving a polynomial optimization of a polynomial function with a reformulation derived by introducing additional variables reducing a degree of the polynomial function till a target degree subject to constraints on a structure of the additional variables; and
solving a mixed-integer optimization problem to find a subset of encodings among all possible encodings of factorizations of the polynomial function that reduce the degree of the polynomial function to the target degree with a predetermined minimum number of additional variables and selects an optimal encoding from the subset of encodings with an optimal relaxation bound.

17. The method of claim 16, wherein, for each encoding in the subset of encodings, the method comprises:
replacing equalities caused by an introduction of additional variables with linear inequalities to receive a polyhedral relaxation of the encoding, solve the polyhedral relaxation to determine a solution as a relaxation bound of the encoding, and select the optimal encoding from the subset of encodings by comparing corresponding relaxation bounds based on an objective of the polyhedral relaxation.

18. A non-transitory computer-readable storage medium embodied thereon a program executable by a processor for performing a method for controlling an operation of a system performing a task, the method comprising:
submitting a sequence of control inputs to the system thereby changing states of the system according to the task;
receiving a feedback signal including a corresponding sequence of measurements, each measurement is indicative of a state of the system caused by the corresponding control input;
determining a current control input for controlling the system based on the feedback signal including a current measurement of a current state of the system by solving a polynomial optimization of a polynomial function with a reformulation derived by introducing additional variables reducing a degree of the polynomial function till a target degree subject to constraints on a structure of the additional variables; and
solving a mixed-integer optimization problem to find a subset of encodings among all possible encodings of factorizations of the polynomial function that reduce the degree of the polynomial function to the target degree with a predetermined minimum number of additional variables and selects an optimal encoding from the subset of encodings with an optimal relaxation bound.

19. The medium of claim 18, wherein, for each encoding in the subset of encodings, the method comprises:
replacing equalities caused by an introduction of additional variables with linear inequalities to receive a polyhedral relaxation of the encoding, solve the polyhedral relaxation to determine a solution as a relaxation bound of the encoding, and select the optimal encoding from the subset of encodings by comparing corresponding relaxation bounds based on an objective of the optimality of the polyhedral relaxation.

* * * * *